US012536797B2

(12) United States Patent
Lu et al.

(10) Patent No.: US 12,536,797 B2
(45) Date of Patent: Jan. 27, 2026

(54) CLOTHING STANDARDIZATION DETECTION METHOD AND APPARATUS

(71) Applicant: HUAWEI CLOUD COMPUTING TECHNOLOGIES CO., LTD., Guizhou (CN)

(72) Inventors: Ruizhi Lu, Shenzhen (CN); Yi Xie, Shenzhen (CN); Xiaoyuan Yu, Hangzhou (CN); Pu Chen, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 282 days.

(21) Appl. No.: 18/322,288

(22) Filed: May 23, 2023

(65) Prior Publication Data
US 2023/0298348 A1 Sep. 21, 2023

Related U.S. Application Data

(63) Continuation of application No. PCT/CN2021/129439, filed on Nov. 9, 2021.

(30) Foreign Application Priority Data

Nov. 24, 2020 (CN) .......................... 202011328749.0

(51) Int. Cl.
*G06V 20/40* (2022.01)
*G06V 10/74* (2022.01)
(Continued)

(52) U.S. Cl.
CPC ............ *G06V 20/41* (2022.01); *G06V 10/761* (2022.01); *G06V 10/776* (2022.01); *G06V 20/46* (2022.01);
(Continued)

(58) Field of Classification Search
None
See application file for complete search history.

(56) References Cited

U.S. PATENT DOCUMENTS

2019/0318210 A1\* 10/2019 Sewak .................. G06F 18/241
2025/0139951 A1\* 5/2025 Perla .................... G06V 10/235

FOREIGN PATENT DOCUMENTS

CN 106504064 A \* 3/2017 ............. G06F 16/58
CN 106599781 A 4/2017
(Continued)

OTHER PUBLICATIONS

Extended European Search Report in European Appln. No. 21896772.7, mailed on Mar. 19, 2024, 8 pages.
(Continued)

*Primary Examiner* — David Ometz
(74) *Attorney, Agent, or Firm* — Fish & Richardson P.C.

(57) ABSTRACT

This disclosure relates to a clothing standardization detection method. In an example method, a clothing standardization detection apparatus obtains a video frame sub-image and a reference sub-image. The video frame sub-image includes an image of a first wear style of a target part of the target object in the first scenario, and the reference includes an image of a standard wear style of a target part of the reference object in the first scenario. Then, the video frame sub-image and the reference sub-image are processed by using a target model, to obtain a first processing result. The target model is a trained artificial intelligence AI model, and the first processing result indicates a similarity between the first wear style of the target part of the target object and the standard wear style of the target part of the reference object.

20 Claims, 8 Drawing Sheets

(51) Int. Cl.
    *G06V 10/776*      (2022.01)
    *G06V 20/50*      (2022.01)
    *G06V 40/10*      (2022.01)
    *G06V 10/774*      (2022.01)

(52) U.S. Cl.
    CPC .............. *G06V 20/50* (2022.01); *G06V 40/10* (2022.01); *G06V 10/774* (2022.01)

(56) References Cited

FOREIGN PATENT DOCUMENTS

| | | | | |
|---|---|---|---|---|
| CN | 108052952 | A | | 5/2018 |
| CN | 109614508 | A * | 4/2019 | ............. G06N 3/045 |
| CN | 109635697 | A | | 4/2019 |
| CN | 110096983 | A * | 8/2019 | ............. G06V 20/40 |
| CN | 110210567 | A * | 9/2019 | ............. G06N 3/045 |
| CN | 111581414 | A * | 8/2020 | ............. G06F 18/22 |
| CN | 111680760 | A * | 9/2020 | ........... G06F 18/214 |
| CN | 111709444 | A | | 9/2020 |
| CN | 111860471 | A * | 10/2020 | ........... G06F 18/214 |
| JP | 2019109760 | A * | 7/2019 | |
| WO | 2020119311 | A1 | | 6/2020 |

OTHER PUBLICATIONS

Extended European Search Report in European Appln No. 21896772.7, dated Mar. 19, 2024, 8 pages.
International Search Report and Written Opinion in International Appln. No. PCT/CN2021/129439, mailed on Feb. 11, 2022, 17 pages (with English translation).

* cited by examiner

CLOTHING STANDARDIZATION DETECTION METHOD AND APPARATUS

CROSS-REFERENCE TO RELATED APPLICATIONS

This application is a continuation of International Application No. PCT/CN2021/129439, filed on Nov. 9, 2021, which claims priority to Chinese Patent Application No. 202011328749.0, filed on Nov. 24, 2020. The disclosures of the aforementioned applications are hereby incorporated by reference in their entireties.

TECHNICAL FIELD

This application relates to the field of artificial intelligence technologies, and in particular, to a clothing standardization detection method and an apparatus.

BACKGROUND

Clothing standardization refers to a uniform dressing requirement formulated, in a particular scenario, for a target object based on some factors for consideration (such as security factors). For example, a construction worker at a construction site needs to wear working clothes, a helmet, and the like. Clothing standardization detection is to use the computer vision (computer vision) processing method to identify whether dressing of the target object is standard. For example, the computer uses a classifier to identify the dressing of the target object, and determines whether the dressing of the target object is standard. The classifier is trained in a customized manner. To be specific, the classifier is trained for wearable clothings of a style.

However, in different scenarios, the target object needs to wear different styles of clothings. Therefore, costs of training the classifier in the customized manner are high. If the classifier is not trained for wearable clothings of a style, it cannot be determined whether the target object wears clothings of the style according to a standard, and this results in low accuracy of clothing standardization detection.

SUMMARY

Embodiments of this application provide a clothing standardization detection method and an apparatus, to reduce model customization costs and improve accuracy of clothing standardization detection.

To achieve the foregoing objectives, the following technical solutions are used in embodiments of this application.

According to a first aspect, an embodiment of this application provides a clothing standardization detection method. The method may be executed by a clothing standardization detection apparatus. The method includes: A clothing standardization detection apparatus obtains a video frame sub-image and a reference sub-image. The video frame sub-image is from a video frame image in a first scenario, the video frame image includes an image of a target object, and the video frame sub-image includes an image of a first wear style of a target part of the target object in the first scenario. The reference sub-image is from a target reference set of the first scenario, the target reference set includes an image of a reference object, and the reference sub-image includes an image of a standard wear style of a target part of the reference object in the first scenario. Then, the clothing standardization detection apparatus processes the video frame sub-image and the reference sub-image by using a target model, to obtain a first processing result. The target model is a trained (artificial intelligence) AI model, and the first processing result indicates a similarity between the first wear style of the target object and the standard wear style of the reference object.

In the clothing standardization detection method in this embodiment of this application, because the target model has a general feature identification capability, in different scenarios, the target model uses the reference sub-image as a reference to determine a feature that the target model is used to identify, for example, a wear style of the target part, so as to determine a similarity between the first wear style and the target wear style of the target part in the first scenario. In other words, even if a scenario change occurs, the target model does not need to be trained for a "scenario after the change", and the target model can complete a task based on a reference sub-image in the "scenario after the change". This reduces the model customization costs and improves the accuracy of clothing standardization detection.

In a possible design, that a clothing standardization detection apparatus obtains a reference sub-image includes: The clothing standardization detection apparatus obtains the target reference set, and detects an image in the target reference set, to obtain a first detection result. The first detection result includes at least one of the following: a skeleton joint point of the target part of the reference object in the target reference set, or first indication information, where the first indication information indicates an area of the target part of the reference object in the image in the target reference set. The clothing standardization detection apparatus determines confidence of the first detection result. The confidence indicates a trustworthiness degree of the first detection result. The clothing standardization detection apparatus extracts the reference sub-image from the image in the target reference set based on the confidence of the first detection result.

In this way, the clothing standardization detection apparatus extracts the reference sub-image with reference to the first detection result and the confidence of the first detection result. Because the first detection result includes at least one of the following information: a detection result of the skeleton joint point of the reference object or the area of the target part of the reference object in the image, the clothing standardization detection apparatus can accurately locate the area of the target part of the reference object in the image in the target reference set, to improve precision of the "reference sub-image extraction".

In a possible design, the reference sub-image includes an image of an area indicated by the first indication information, and confidence of a skeleton joint point in the area indicated by the first indication information meets a first preset condition, so that the reference sub-image includes an image of the target part of the reference object, to improve precision of the reference sub-image extraction.

In a possible design, that a clothing standardization detection apparatus obtains a video frame sub-image includes: The clothing standardization detection apparatus obtains the video frame image, and detects the video frame image to obtain a second detection result. The second detection result includes at least one of the following: a skeleton joint point of the target part of the target object in the video frame image, or second indication information, where the second indication information indicates an area of the target part of the target object in the video frame image. The clothing standardization detection apparatus determines confidence of the second detection result. The confidence indicates a trustworthiness degree of the second detection result. The clothing standardization detection apparatus extracts the video frame sub-image from the video frame image based on the confidence of the second detection result.

In this way, the clothing standardization detection apparatus extracts the video frame sub-image with reference to the second detection result and the confidence of the second detection result. Because the second detection result includes at least one of the following information: a detection result of the skeleton joint point of the target object or the area of the target part of the target object in the image, the clothing standardization detection apparatus can accurately locate the area of the target part of the target object in the video frame image, to improve precision of the "video frame sub-image extraction".

In a possible design, the video frame sub-image includes an image of an area indicated by the second indication information, and confidence of a skeleton joint point in the area indicated by the second indication information meets a second preset condition, so that the video frame sub-image includes an image of the target part of the target object, to improve precision of the video frame sub-image extraction.

In a possible design, the target reference set includes at least one of the following: an image of the standard wear style of the reference object at at least one angle, or an image of the standard wear style of the reference object at at least one brightness level. In this way, in one or more images in the target reference set, there is an image that fits an angle or a brightness level of the video frame sub-image, and this helps improve processing efficiency and determining precision of the target model.

In a possible design, the target reference set is a reference set that is updated based on a similarity between wear images in a verification set; and the verification set includes at least one of the following: wear images of the target part of a verification object at at least two angles in the first scenario, or wear images of the target part of the verification object at at least two brightness levels in the first scenario. In other words, the target reference set is an updated reference set, and more fits the first scenario.

In a possible design, the clothing standardization detection apparatus processes a first candidate set and the verification set by using the target model, to obtain a second processing result. The first candidate set is a set in a candidate set, the candidate set includes the target reference set. The verification set includes at least one of the following: wear images of the target part of the verification object at at least two angles in the first scenario, or wear images of the target part of the verification object at at least two brightness levels in the first scenario. The second processing result is a similarity that is between the wear images in the verification set and that is determined by using the first candidate set as a reference. Then, the clothing standardization detection apparatus determines, based on the similarity indicated by the second processing result, the first candidate set as the target reference set.

In other words, the clothing standardization detection apparatus determines the target reference set based on a result of processing the verification set by using the target model when the first candidate set is used as a reference, so that the image in the target reference set more fits the first scenario.

In a possible design, the clothing standardization detection apparatus processes a first reference set and the verification set by using the target model, to obtain a third processing result. The first reference set is a set that provides a reference image to the target model before the target reference set is determined. The third processing result is a similarity that is between wear images in the verification set and that is determined by using the first reference set as a reference. That the clothing standardization detection apparatus determines, based on the similarity indicated by the second processing result, the first candidate set as the target reference set includes: If the similarity indicated by the second processing result is greater than the similarity indicated by the third processing result, the clothing standardization detection apparatus uses the first candidate set as the target reference set, so that the image in the target reference set more fits the first scenario.

In a possible design, that the clothing standardization detection apparatus determines, based on the similarity indicated by the second processing result, the first candidate set as the target reference set includes: If the similarity indicated by the second processing result is greater than a first threshold, the clothing standardization detection apparatus uses the first candidate set as the target reference set, so that the image in the target reference set more fits the first scenario.

In a possible design, the first candidate set includes an image of a second wear style of the target part of the reference object in the first scenario. The image of the second wear style meets at least one of the following: a similarity between the second wear style and the standard wear style is greater than a second threshold; or a similarity between the second wear style and the standard wear style meets a preset status in similarity distribution. The similarity distribution includes similarities between the second wear style and the standard wear style at a plurality of moments.

In a possible design, the clothing standardization detection apparatus provides visual information to a user by using a display unit. The visual information includes at least one of the following: the similarity indicated by the first processing result, identifying a target object whose similarity of the first processing result is lower than a first threshold, or identifying a target part whose similarity of the first processing result is lower than a second threshold, so that the user browses a clothing standardization detection result conveniently.

According to a second aspect, an embodiment of this application provides a clothing standardization detection method. The method may be performed by a clothing standardization detection apparatus, or may be performed by a chip used in the clothing standardization detection apparatus. The following provides descriptions by using an example in which an execution body is the clothing standardization detection apparatus. The method includes: The clothing standardization detection apparatus obtains a first training sample and a second training sample. The first training sample includes an image of at least one sample, the second training sample includes an image of at least one wear style of a target part of the sample, and the sample includes the target part. The clothing standardization detection apparatus performs model training by using the first training sample, to obtain a model parameter of a backbone network and a model parameter of a branch network. The clothing standardization detection apparatus performs model training by using the second training sample, to correct the model parameter of the branch network, and obtain a target model.

In this way, the clothing standardization detection apparatus performs training based on the first training sample, to obtain a model parameter of the target model, so that the target model has a general feature identification capability. The clothing standardization detection apparatus then performs training based on the second training sample, to adjust the model parameter of the branch network of the target model, and improve a local part identification capability of the target model. Because the target model can identify different features, the target model can be applied to different scenarios, and a model does not need to be separately trained for a specific scenario. This reduces model customization costs.

In a possible design, that the clothing standardization detection apparatus performs model training by using the first training sample, to obtain a model parameter of a backbone network and a model parameter of a branch network includes: The clothing standardization detection apparatus groups the first training sample into at least one first training sample group. The first training sample group includes a first positive-class sample and a first negative-class sample. The first positive-class sample includes an image identified with a first label, the first negative-class sample includes an image not identified with the first label, and the first label indicates one of the at least one sample. The clothing standardization detection apparatus performs model training by using the first training sample group, to obtain the model parameter of the backbone network and the model parameter of the branch network, so that a binary classification capability of the target model for the general feature is improved.

In a possible design, that the clothing standardization detection apparatus performs model training by using the second training sample, to correct the model parameter of the branch network includes: The clothing standardization detection apparatus groups the second training sample into at least one second training sample group. The second training sample group includes a second positive-class sample and a second negative-class sample. The second positive-class sample includes an image identified with a second label, the second negative-class sample includes an image not identified with the second label, and the second label indicates one of the at least one wear style. The clothing standardization detection apparatus performs model training by using the second training sample group, to correct the model parameter of the branch network, so that a binary classification capability of the target model for a specific feature is improved.

According to a third aspect, an embodiment of this application provides a clothing standardization detection apparatus. The clothing standardization detection apparatus may be the apparatus in any one of the first aspect or the possible designs of the first aspect, or a chip that implements the foregoing functions. The clothing standardization detection apparatus includes a corresponding module, unit, or means (means) for implementing the foregoing methods. The module, unit, or means may be implemented by hardware or software, or implemented by hardware by executing corresponding software. The hardware or the software includes one or more modules or units corresponding to the foregoing functions.

The clothing standardization detection apparatus includes an obtaining unit and a processing unit. The obtaining unit is configured to obtain a video frame sub-image and a reference sub-image. The video frame sub-image is from a video frame image in a first scenario, the video frame image includes an image of a target object, and the video frame sub-image includes an image of a first wear style of a target part of the target object in the first scenario. The reference sub-image is from a target reference set of the first scenario, the target reference set includes an image of a reference object, and the reference sub-image includes an image of a standard wear style of a target part of the reference object in the first scenario. The processing unit is configured to process the video frame sub-image and the reference sub-image by using a target model, to obtain a first processing result, where the target model is a trained artificial intelligence AI model, and the first processing result indicates a similarity between the first wear style of the target object and the standard wear style of the reference object.

In a possible design, the obtaining unit is specifically configured to: obtain the target reference set; detect an image in the target reference set, to obtain a first detection result, where the first detection result includes at least one of the following: a skeleton joint point of the target part of the reference object in the target reference set, or first indication information, where the first indication information indicates an area of the target part of the reference object in the image in the target reference set; determine confidence of the first detection result, where the confidence indicates a trustworthiness degree of the first detection result; and extract the reference sub-image from the image in the target reference set based on the confidence of the first detection result.

In a possible design, the reference sub-image includes an image of an area indicated by the first indication information, and confidence of a skeleton joint point in the area indicated by the first indication information meets a first preset condition.

In a possible design, the obtaining unit is specifically configured to: obtain the video frame image; detect the video frame image, to obtain a second detection result, where the second detection result includes at least one of the following: a skeleton joint point of the target part of the target object in the video frame image, or second indication information, where the second indication information indicates an area of the target part of the target object in the video frame image; determine confidence of the second detection result, where the confidence indicates a trustworthiness degree of the second detection result; and extract the video frame sub-image from the video frame image based on the confidence of the second detection result.

In a possible design, the video frame sub-image includes an image of an area indicated by the second indication information, and confidence of a skeleton joint point in the area indicated by the second indication information meets a second preset condition.

In a possible design, the target reference set includes at least one of the following: an image of the standard wear style of the reference object at at least one angle, or an image of the standard wear style of the reference object at at least one brightness level.

In a possible design, the target reference set is a reference set that is updated based on a similarity between wear images in a verification set. The verification set includes at least one of the following: wear images of the target part of a verification object at at least two angles in the first scenario, or wear images of the target part of the verification object at at least two brightness levels in the first scenario.

In a possible design, the processing unit is further configured to: process a first candidate set and the verification set by using the target model, to obtain a second processing result, where the first candidate set is a set in a candidate set, and the candidate set includes the target reference set; the verification set includes at least one of the following: wear images of the target part of the verification object at at least two angles in the first scenario, or wear images of the target part of the verification object at at least two brightness levels in the first scenario; and the second processing result is a similarity that is between the wear images in the verification set and that is determined by using the first candidate set as a reference; and determine, based on the similarity indicated by the second processing result, the first candidate set as the target reference set.

In a possible design, the processing unit is further configured to process a first reference set and a verification set by using the target model, to obtain a third processing result. The first reference set is a set that provides a reference image to the target model before the target reference set is determined. The third processing result is a similarity that is between wear images in the verification set and that is determined by using the first reference set as a reference. That the processing unit is configured to determine, based on the similarity indicated by the second processing result, the first candidate set as the target reference set includes: If the similarity indicated by the second processing result is greater than the similarity indicated by the third processing result, the processing unit is configured to use the first candidate set as the target reference set, so that the image in the target reference set more fits the first scenario.

In a possible design, that the processing unit is configured to determine, based on the similarity indicated by the second processing result, the first candidate set as the target reference set includes: If the similarity indicated by the second processing result is greater than a first threshold, the processing unit is configured to use the first candidate set as the target reference set, so that the image in the target reference set more fits the first scenario.

In a possible design, the first candidate set includes an image of a second wear style of the target part of the reference object in the first scenario. The image of the second wear style meets at least one of the following: a similarity between the second wear style and the standard wear style is greater than a second threshold; or a similarity between the second wear style and the standard wear style meets a preset status in similarity distribution. The similarity distribution includes similarities between the second wear style and the standard wear style at a plurality of moments.

In a possible design, the clothing standardization detection apparatus further includes: a display unit, configured to provide visual information to a user, where the visual information includes at least one of the following: the similarity indicated by the first processing result, identifying a target object whose similarity of the first processing result is lower than a first threshold, or identifying a target part whose similarity of the first processing result is lower than a second threshold.

According to a fourth aspect, an embodiment of this application provides a clothing standardization detection apparatus. The clothing standardization detection apparatus may be the apparatus in any one of the second aspect or the possible designs of the second aspect, or a chip that implements the foregoing functions. The clothing standardization detection apparatus includes a corresponding module, unit, or means (means) for implementing the foregoing methods. The module, unit, or means may be implemented by hardware or software, or implemented by hardware by executing corresponding software. The hardware or the software includes one or more modules or units corresponding to the foregoing functions.

The clothing standardization detection apparatus includes an obtaining unit and a processing unit. The obtaining unit is configured to obtain a first training sample and a second training sample. The first training sample includes an image of at least one sample, the second training sample includes an image of at least one wear style of a target part of the sample, and the sample includes the target part. The processing unit is configured to perform model training by using the first training sample, to obtain a model parameter of a backbone network and a model parameter of a branch network. The processing unit is further configured to perform model training by using the second training sample, to correct the model parameter of the branch network, and obtain a target model.

In a possible design, the processing unit is specifically configured to: group the first training sample into at least one first training sample group, where the first training sample group includes a first positive-class sample and a first negative-class sample; and the first positive-class sample includes an image identified with a first label, the first negative-class sample includes an image not identified with the first label, and the first label indicates one of the at least one sample; and perform model training by using the first training sample group, to obtain the model parameter of the backbone network and the model parameter of the branch network.

In a possible design, the processing unit is specifically configured to: group the second training sample into at least one second training sample group, where the second training sample group includes a second positive-class sample and a second negative-class sample; and the second positive-class sample includes an image identified with a second label, the second negative-class sample includes an image not identified with the second label, and the second label indicates one of the at least one wear style; and perform model training by using the second training sample group, to correct the model parameter of the branch network.

According to a fifth aspect, an embodiment of this application provides a device, where the device includes a processor and a memory. The processor and the memory communicate with each other. The processor is configured to execute instructions stored in the memory, so that the device performs the clothing standardization detection method according to any one of the first aspect or the designs of the first aspect, or performs the clothing standardization detection method according to any one of the second aspect or the designs of the second aspect.

According to a sixth aspect, an embodiment of this application provides a computer-readable storage medium. The computer-readable storage medium stores instructions, and the instructions are used to instruct a device to perform the clothing standardization detection method according to any one of the first aspect or the designs of the first aspect, or perform the clothing standardization detection method according to any one of the second aspect or the designs of the second aspect.

According to a seventh aspect, this application provides a computer program product including instructions. When the computer program product runs on a device, the device is enabled to perform the clothing standardization detection method according to any one of the first aspect or the designs of the first aspect, or perform the clothing standardization detection method according to any one of the second aspect or the possible designs of the second aspect.

For technical effects of any one of the designs of the third aspect to the seventh aspect, refer to the beneficial effects in the corresponding methods provided above. Details are not described herein again.

DESCRIPTION OF EMBODIMENTS

Figure 1:
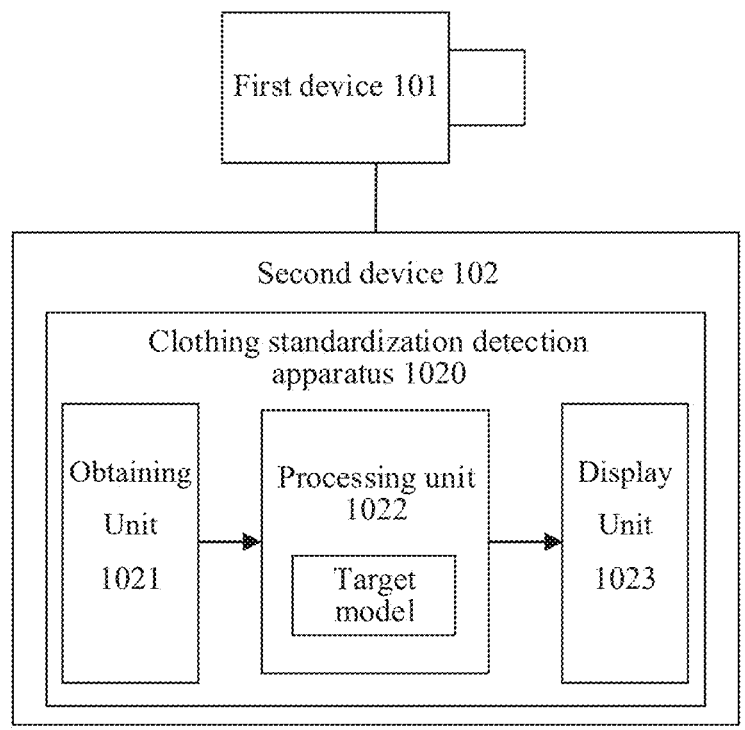
FIG. 1 is a schematic diagram of a system architecture according to an embodiment of this application.

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the word such as "example" or "for example" represents giving an example, an illustration, or a description. Any embodiment or design scheme described as "example" or "for example" in embodiments of this application should not be explained as being more better or having more advantages than another embodiment or design scheme. Exactly, use of the word "example", "for example", or the like is intended to present a relative concept in a specific manner.

To make this application clearer, some concepts and processing procedures mentioned in this application are first briefly described.

1. Few-Shot Learning (Few-Shot Learning, FSL) and FSL Model

The few-shot learning is a kind of computer vision (computer vision) processing technology. A basic idea of the few-shot learning is as follows: First, the FSL model is pre-trained on a large-scale dataset. Then, for an application scenario, the FSL model can complete a corresponding task by using a small quantity of pictures in the scenario as a reference, to reduce artificial intelligence customization costs, and has a great application value in actual application.

2. Scenario

A scenario is a result of classifying, based on a specific condition, an environment in which a target object is located. For example, if "the target object is a person", according to a work type, a construction site in which a construction worker is located may be described as a "construction site" scenario, a dining hall kitchen in which a chef is located may be described as a "dining hall kitchen" scenario, and a conference site in which a staff member attending a conference is located may be described as a "conference site" scenario. The scenario may alternatively be described as an "occasion", a "scene", or the like.

3. General Feature and Specific Feature

The general feature is a feature not associated with a scenario, such as the head, the upper body, the lower body, a hand, or a color.

The specific feature is a feature associated with a scenario. For example, in a "construction site" scenario, a construction worker needs to wear working clothes, and a helmet. In this scenario, specific features include a helmet wear style of the "head" and a working clothes wear style of the "upper body". For another example, in a "dining hall kitchen" scenario, a staff member needs to wear working clothes, a sanitary cap, and a mask. In this scenario, specific features include: a sanitary cap wear style of the "head", a mask wear style of the "head", and a working clothes wear style of the "upper body". For still another example, in a "conference site" scenario, an attendee needs to wear formal clothes with a uniform style. In this scenario, specific features include a formal clothes wear style of the "upper body" and a formal clothes wear style of the "lower body".

4. Clothing Standardization

The clothing standardization refers to a uniform dressing requirement formulated, in a particular scenario, for a target object based on some factors for consideration. For example, in a "construction site" scenario, the target object is a construction worker. In consideration of safety factors, the construction worker needs to wear working clothes, and a helmet. For another example, in a "dining hall kitchen" scenario, the target object is a staff member. In consideration of sanitation factors, the staff member needs to wear working clothes, a sanitary cap, a mask, and the like. For still another example, in a scenario such as a conference site, the target object is an attendee. In consideration of appearance and bearing factors, the attendee needs to wear formal clothes with a uniform style. It can be learned that in different scenarios, people need to wear clothings in different styles.

5. Clothing Standardization Detection

The clothing standardization detection is to use a computer vision (computer vision) processing method to identify whether dressing of a target object is standard. For example, a computer uses a classifier to identify the dressing of the target object, to determine whether the dressing of the target object is standard. The classifier is trained in a customized manner. To be specific, the classifier is trained for wearable clothings of a style.

The following describes a clothing standardization detection method.

Method 1: Attribute Classification Based on Target Objects

In a training phase, a classifier is first trained by using a large quantity of training samples, so that when a whole body image of the target object is given, the classifier can identify whether wear of each part of the target object is standard. The training samples include an image of a target object wearing particular clothing and an image of a target object not wearing particular clothing. In an application phase, the classifier is used to perform attribute classification on the whole body image of the target object, to determine whether the wear of each part of the target object is standard.

It can be learned that, in the method 1, in one aspect, the classifier performs attribute classification based on the whole body image of the target object. Because a particular part of a human body usually occupies a very small portion of the whole body image of the target object, a signal-to-noise ratio of data input into the classifier is low. This increases classification difficulty of the classifier and causes low classification accuracy. In another aspect, the classifier is trained in a customized manner, to be specific, a large quantity of images including wear of clothing of a particular style are used to train the classifier, and costs are excessively high. Further, when one classifier is trained for one wear style, there are various scenarios in an application process, and different scenarios have different requirements on wear styles of different parts. Therefore, costs of customized training of the classifier are further increased.

Method 2: Attribute Classification Based on Local Parts

In a training phase, a classifier is first trained by using a large quantity of training samples, so that when an image of a local part of the target object is given, the classifier can identify whether wear of the part is standard. The training samples include an image of a local part wearing particular clothing and an image of a local part not wearing the particular clothing. In an application phase, first, a detection model is used to detect a video frame image, to obtain a whole body image of the target object. Then, a human body posture estimation model is used to detect the whole body image of the target object, to obtain a local part image of the target object. Finally, the classifier is used to perform attribute classification on an image of each local part, to determine whether wear of each part is standard.

It can be learned that, in the method 2, in one aspect, the classifier is trained in a customized manner, and costs are excessively high. For details, refer to an analysis process of the "another aspect" in the method 1. Details are not described herein again. In another aspect, the human body posture estimation model identifies a local part by calculating a skeleton joint point. However, in some local parts (for example, the head), skeleton joint point information is not enough or a skeleton joint point prediction error is large. As a result, a positioning deviation of the local part is large, and determining, by the classifier, whether wear of the part is standard is affected.

To sum up, in the foregoing two methods, the classifier is trained first. However, in different scenarios, the target object needs to wear different styles of clothings. Therefore, costs of training the classifier in the customized manner are high. If the classifier is not trained for wearable clothings of a style, it cannot be determined whether the target object wears clothings of the style according to a standard, and this results in low accuracy of clothing standardization detection.

In view of this, an embodiment of this application provides a clothing standardization detection method. In this method, first, a video frame sub-image and a reference sub-image are obtained. The video frame sub-image is from a video frame image in a first scenario, the video frame image includes an image of a target object, and the video frame sub-image includes an image of a first wear style of a target part of the target object in the first scenario. The reference sub-image is from a target reference set of the first scenario, the target reference set includes an image of a reference object, and the reference sub-image includes an image of a standard wear style of a target part of the reference object in the first scenario. Then, the video frame sub-image and the reference sub-image are processed by using a target model, to obtain a first processing result. The target model is a trained artificial intelligence (artificial intelligence, AI) model, and has a general feature identification capability. The first processing result indicates a similarity between the first wear style of the target object and the standard wear style of the reference object. Because the target model uses the reference sub-image as a reference to determine to-be-identified features, to obtain the first processing result, even if a scenario changes, reference sub-images in different scenarios are different. The target model may determine the to-be-identified features based on a new reference sub-image, and does not need to be retrained, thereby reducing model customization costs.

The clothing standardization detection method provided in this embodiment of this application may be applied to a system architecture including but not limited to that shown in FIG. 1.

As shown in FIG. 1, the system architecture includes a first device 101 and a second device 102. The first device 01 is an image acquisition device, and the image acquisition device may be specifically a camera, an image sensor, or the like. The second device 102 is a processing device. The processing device has a central processing unit (central processing unit, CPU) and/or a graphics processing unit (graphics processing unit, GPU), and is configured to process a video frame image acquired by the image acquisition device, so as to implement clothing standardization detection.

It should be noted that the second device 102 may be a physical device or a physical device cluster, for example, a terminal, a server, or a server cluster. Certainly, the second device 102 may alternatively be a virtualized cloud device, for example, at least one cloud computing device in a cloud computing cluster. The first device 101 and the second device 102 may be independent devices, or may be integrated. For example, the first device 101 is a portion of the second device 102. This is not limited in this embodiment of this application. This embodiment of this application is described by using an example in which "the first device 101 and the second device 102 are independent devices".

During specific implementation, the first device 101 acquires a video stream, for example, a plurality of frames of video frame images of a construction site in a time period. Then, the first device 101 sends the video stream or a frame of video frame image to the second device 102. A clothing standardization detection apparatus 1020 is deployed in the second device 102. The clothing standardization detection apparatus 1020 includes an obtaining unit 1021, a processing unit 1022, and a display unit 1023. The obtaining unit 1021 is configured to obtain the video frame sub-image and the reference sub-image. The processing unit 1022 is configured to: invoke the target model, and process the video frame sub-image and the reference sub-image by using the target model, to obtain the first processing result. Optionally, the display unit 1023 is configured to display visual information, such as the similarity indicated by the first processing result, a target object with unstandardized wear, and a target part with unstandardized wear.

To make the technical solutions of this application clearer and easier to understand, the following describes clothing standardization detection methods provided in embodiments of this application.

Figure 2:
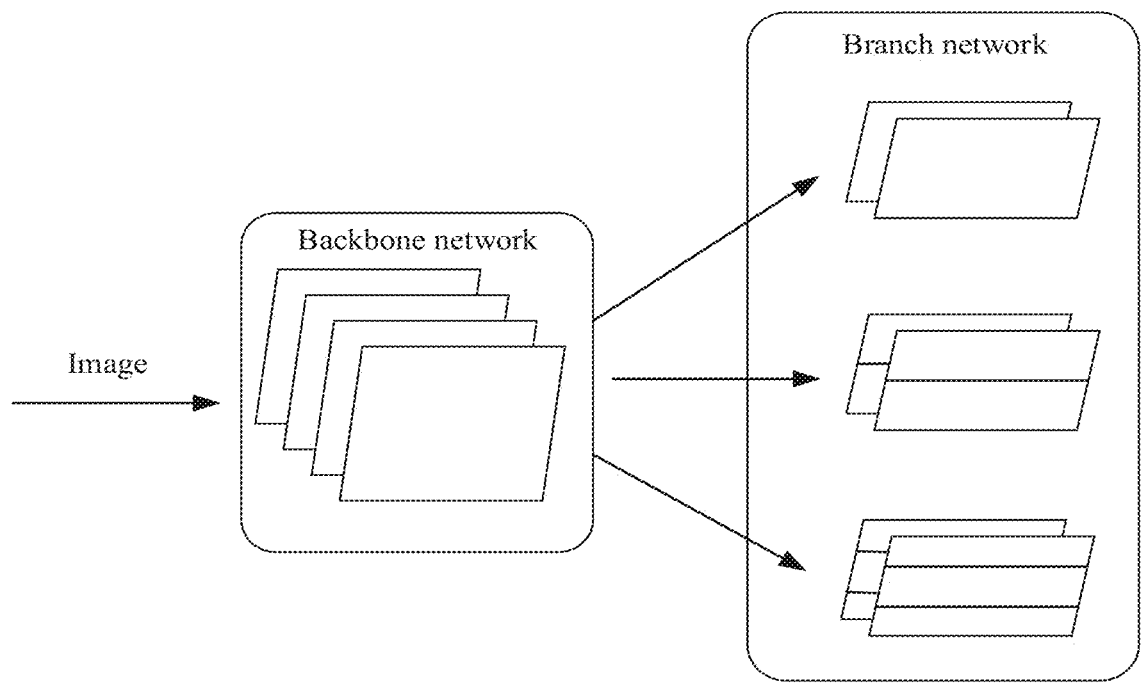
FIG. 2 is a schematic diagram of a structure of a few-shot learning model according to an embodiment of this application.

In a model training phase, an embodiment of this application provides a model training method, used to train a target model. The target model includes a backbone network and a branch network. The target model includes an FSL model. The FSL model is a "backbone—multi-branch"

network structure, to be specific, a network structure of the FSL model includes a backbone network and a branch network, as shown in FIG. 2. The backbone network may also be described as a main network or a main structure. The backbone network may be a main structure of any neural network. First, the backbone network processes an input image (such as the video frame sub-image and the reference sub-image), to obtain a processing result of the backbone network. Then, a processing result of the backbone network is input to the branch network at different segmentation granularities, to obtain a processing result of the branch network, namely, a feature vector of the input image. When the input image is the video frame sub-image, the FSL model may obtain a feature vector of the video frame sub-image. When the input image is the reference sub-image, the FSL model may obtain a feature vector of the reference sub-image. Then, the FSL model calculates, based on the feature vector of the video frame sub-image and the feature vector of the reference sub-image, a distance between the two feature vectors, namely, a similarity between the sub-image of the video frame and the reference sub-image.

Figure 3:
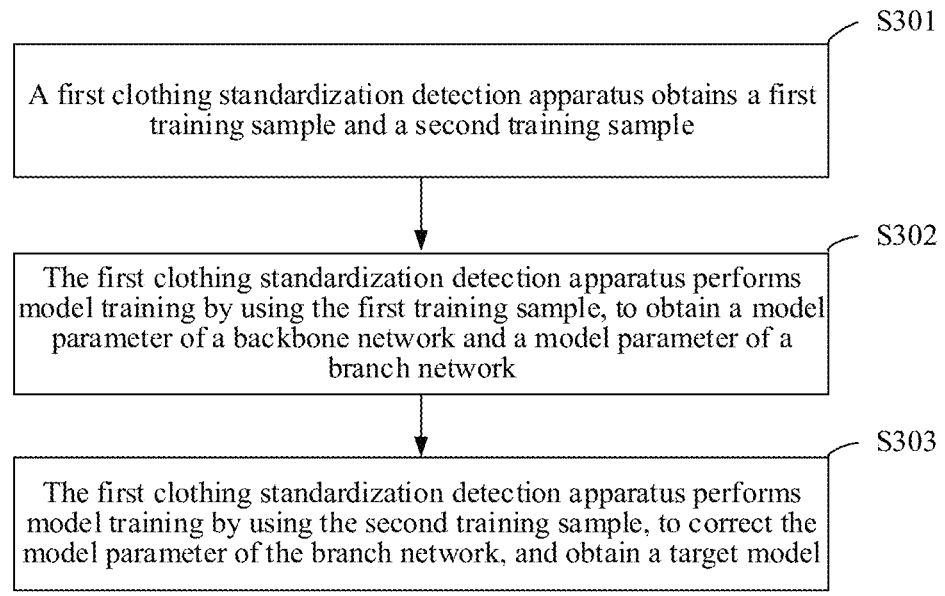
FIG. 3 is a schematic flowchart of a clothing standardization detection method according to an embodiment of this application.

Refer to FIG. 3. Steps of the model training phase are as follows.

S301: A first clothing standardization detection apparatus obtains a first training sample and a second training sample.

The first clothing standardization detection apparatus is configured to train a target model. The first training sample includes an image of at least one sample. The sample may be a person, an animal, or the like. In this embodiment of this application, descriptions are provided by using the person as an example.

For example, the first training sample may include images of a large quantity of samples. The first training sample includes $N_{train}$ images, and is denoted as $P_{train}=\{P_{train}^1, P_{train}^2, \ldots, P_{train}^{N_{train}}\}$. $P_{train}$ indicates the first training sample $P_{train}^1$ indicates a $1^{st}$ image in the first training sample, $P_{train}^2$ indicates a $2^{nd}$ image in the first training sample, and $P_{train}^{N_{train}}$ indicates an $N_{train}^{th}$ image in the first training sample. An example in which "one sample image includes one portrait" is used. When "one portrait corresponds to one label", labels corresponding to the first training sample are denoted as $Y_{train}=\{Y_{train}^1, Y_{train}^2, \ldots, Y_{train}^{N_{train}}\}$. $Y_{train}$ represents the sample labels corresponding to the first training sample, $Y_{train}^1$ represents a label of a $1^{st}$ portrait, $Y_{train}^2$ represents a label of a $2^{nd}$ portrait, and $Y_{train}^{N_{train}}$ represents a label of an $N_{train}^{th}$ portrait.

The second training sample includes an image of at least one wear style of a target part. The target part is one or more parts on a sample. For example, when the sample is a person, the target part may be, for example, but is not limited to, at least one of the following parts: the head, the upper body, or the lower body. For example, the second training sample may include at least one of the following images: a head image, an upper body image, or a lower body image. In the head image, there may be one or more styles of a cap worn on the head. In the upper body image, there may be one or more upper body clothing styles. In the lower body image, there may be one or more lower body clothing styles.

For example, the second training sample may include the head image. In the second training sample, there are $N_{train}$ images including the head, which are denoted as $H_{train}=\{H_{train}^1, H_{train}^2, \ldots, H_{train}^{N_{train}}\}$. $H_{train}$ represents the images including the head in the second training sample. In the images including the head, $H_{train}^1$ represents a $1^{st}$ image, $H_{train}^2$ represents a $2^{nd}$ image, and $H_{train}^{N_{train}}$ represents an $N_{train}^{th}$ image. An example in which "one image includes one head image" is used. When "one head image corresponds to one label", labels corresponding to the head images in the second training sample are denoted as $HY_{train}=\{HY_{train}^1, HY_{train}^2, \ldots, HY_{train}^{N_{train}}\}$. $HY_{train}$ represents the labels corresponding to the head images in the second training sample, $HY_{train}^1$ represents a label of a $1^{st}$ head image, $HY_{train}^2$ represents a label of a $2^{nd}$ head image, and $HY_{train}^{N_{train}}$ represents a label of an $NHY_{train}^{th}$ head image.

For another example, the second training sample may include the upper body image. In the second training sample, there are $N_{train}$ images including the upper body, which are denoted as $U_{train}=\{U_{train}^1, U_{train}^2, \ldots, U_{train}^{N_{train}}\}$. $U_{train}$ represents the images including the upper body in the second training sample. In the images including the upper body, $U_{train}^1$ represents a $1^{st}$ image, $U_{train}^2$ represents a $2^{nd}$ image, and $U_{train}^{N_{train}}$ represents an $N_{train}^{th}$ image. An example in which "one image includes one upper body image" is used. When "one upper body image corresponds to one label", labels corresponding to the upper body images in the second training sample are denoted as $U_{train}=\{U_{train}^1, U_{train}^2, \ldots, U_{train}^{N_{train}}\}$. $U_{train}$ represents the labels corresponding to the upper body images in the second training sample, $UY_{train}^1$ represents a label of a $1^{st}$ upper body image, $UY_{train}^2$ represents a label of a $2^{nd}$ upper body image, and $UY_{train}^{N_{train}}$ resents a label of an $N_{train}^{th}$ upper body image.

For still another example, the second training sample may include the lower body image. In the second training sample, there are $N_{train}$ images including the lower body, which are denoted as $L_{train}=\{L_{train}^1, L_{train}^2, \ldots, L_{train}^{N_{train}}\}$. $L_{train}$ represents the images including the lower body in the second training sample. In the images including the lower body, $L_{train}^1$ represents a $1^{st}$ image, $L_{train}^2$ represents a $2^{nd}$ image, and $L_{train}^{N_{train}}$ represents an $N_{train}^{th}$ image. An example in which "one image includes one lower body image" is used. When "one lower body image corresponds to one label", labels corresponding to the lower body images in the second training sample are denoted as $LY_{train}=\{LY_{train}^1, LY_{train}^2, \ldots, LY_{train}^{N_{train}}\}$, $LY_{train}$ represents the labels corresponding to the lower body images in the second training sample, $LY_{train}^1$ represents a label of a $1^{st}$ lower body image, $LY_{train}^2$ represents a label of a $2^{nd}$ lower body image, and $LY_{train}^{N_{train}}$ represents a label of an $N_{train}^{th}$ lower body image.

It should be noted that the first training sample and the second training sample have no association relationship with the first scenario. The first scenario is a scenario related to a model application phase. For details, refer to the descriptions of S501a. Details are not described herein again. An example in which the sample is a person is still used as an example. An image in the first training sample may be an image of the sample in any scenario. An image in the second training sample may be an image of any part, and a wear style on the part may be a wear style in any scenario. In this way, the target model obtained through training based on the first training sample and the second training sample has a general feature identification capability, and can be applied to different scenarios. There is no need to train different models for different scenarios, so that model customization costs are reduced.

S302: The first clothing standardization detection apparatus performs model training by using the first training sample, to obtain a model parameter of a backbone network and a model parameter of a branch network.

The model parameter may be, for example, but is not limited to, a model weight.

Figure 4A:
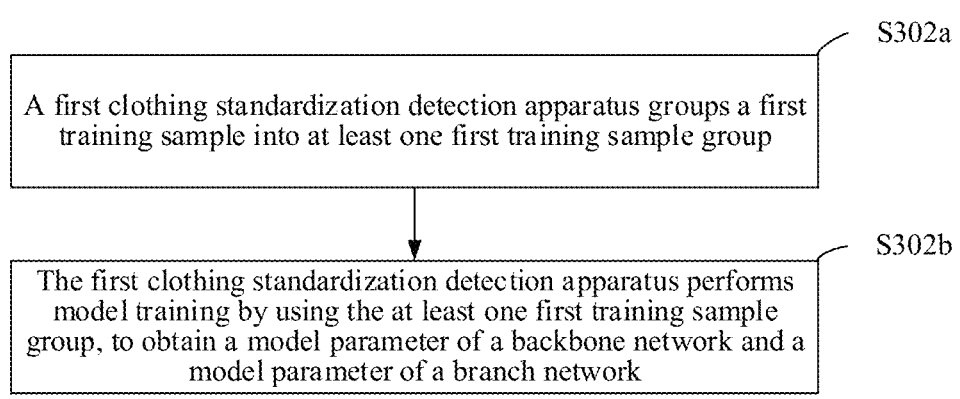
FIG. 4a is a schematic flowchart of a model training method according to an embodiment of this application.

For example, refer to FIG. 4a. An implementation process of S302 is as follows.

S302a: The first clothing standardization detection apparatus groups the first training sample into at least one first training sample group.

The first training sample group includes a first positive-class sample and a first negative-class sample. The first positive-class sample includes an image identified with a first label, the first negative-class sample includes an image not identified with the first label, and the first label indicates one of the at least one sample.

For example, first, the first clothing standardization detection apparatus randomly groups sample images in the first training sample, to obtain at least one first training sample group. Each first training sample group includes four sample images belonging to a same label and four sample images whose label is different from the foregoing label. Each first sample training group E is as follows:

$$E = \{P_{train}^a, P_{train}^b, P_{train}^c, P_{train}^d, P_{train}^e, P_{train}^f, P_{train}^g, P_{train}^h\}$$

s.t. $Y_{train}^a = Y_{train}^b = Y_{train}^c = Y_{train}^d$ $Y_{train}^e \neq Y_{train}^a$ $Y_{train}^f \neq Y_{train}^a$ $Y_{train}^g \neq Y_{train}^a$ $Y_{train}^h \neq Y_{train}^a$ E represents a first sample training group, a value of each letter in the foregoing superscripts a to h is an integer, and a value range may be [1, $N_{train}$].

Then, the first clothing standardization detection apparatus redefines labels in the first sample training group E. To be specific, the labels in the first sample training group E satisfy:

$$\begin{cases} Y'^a_{train} = Y'^b_{train} = Y'^c_{train} = Y'^d_{train} = 0 \\ Y'^e_{train} = Y'^f_{train} = Y'^g_{train} = Y'^h_{train} = 1 \end{cases} \quad \text{Formula (1)}$$

$Y'^a_{train}$, $Y'^b_{train}$, $Y'^c_{train}$, and $Y'^d_{train}$ belong to the first label, and identify images of a sample. $Y'^e_{train}$, $Y'^f_{train}$, $Y'^g_{train}$, and $Y'^h_{train}$ do not belong to the first label, and identify images that are in the foregoing sample images and that are of another sample other than "the sample identified by the first label".

S302b: The first clothing standardization detection apparatus performs model training by using the at least one first training sample group, to obtain a model parameter of a backbone network and a model parameter of a branch network.

For example, the first clothing standardization detection apparatus performs iterative parameter learning based on the first sample training group E and the redefined labels by using a gradient descent method and a back propagation method, to obtain the model parameter of the backbone network and the model parameter of the branch network.

In this way, the first clothing standardization detection apparatus performs model training based on the first positive-class sample and the first negative-class sample, to improve a binary classification capability of the target model for the general feature. In this way, in an actual application scenario, the target model may complete a task by using a reference sub-image as a reference.

S303: The first clothing standardization detection apparatus performs model training by using the second training sample, to correct the model parameter of the branch network, and obtain the target model.

The target model may be, for example, but is not limited to, an FSL model.

Figure 4B:
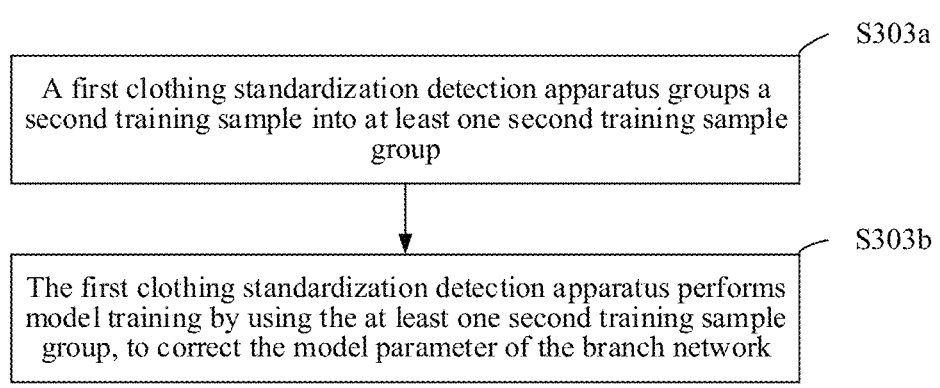
FIG. 4b is a schematic flowchart of another model training method according to an embodiment of this application.

For example, refer to FIG. 4b. An implementation process of S303 is as follows.

S303a: The first clothing standardization detection apparatus groups the second training sample into at least one second training sample group.

The second training sample group includes a second positive-class sample and a second negative-class sample. The second positive-class sample includes an image identified with a second label, the second negative-class sample includes an image not identified with the second label, and the second label indicates one of the at least one wear style.

For example, a head image is used as an example. First, the first clothing standardization detection apparatus randomly groups head images in the second training sample, to obtain at least one second training sample group. Each second training sample group includes four head images belonging to a same label and four head images whose label is different from the foregoing label. To be specific, each second sample training group P is as follows:

$$F = \{H_{train}^a, H_{train}^b, H_{train}^c, H_{train}^d, H_{train}^e, H_{train}^f, H_{train}^g, H_{train}^h\}$$

s.t. $H_{train}^a = H_{train}^b = H_{train}^c = H_{train}^d$ $H_{train}^e \neq H_{train}^a$ $H_{train}^f \neq H_{train}^a$ $H_{train}^g \neq H_{train}^a$ $H_{train}^h \neq H_{train}^a$ F represents a second sample training group, a value of each letter in the foregoing superscripts a to h is an integer, and a value range may be [1, $N_{train}$].

Then, the first clothing standardization detection apparatus redefines labels in the second sample training group F. To be specific, the labels in the second sample training group F satisfy:

$$\begin{cases} HY'^a_{train} = HY'^b_{train} = HY'^c_{train} = HY'^d_{train} = 0 \\ HY'^e_{train} = HY'^f_{train} = HY'^g_{train} = HY'^h_{train} = 1 \end{cases} \quad \text{Formula (2)}$$

$H'^a_{train}$, $H'^b_{train}$, $H'^c_{train}$, and $H'^d_{train}$ belong to the second label, and identify head images of a sample. $H'^e_{train}$, $H'^f_{train}$, $H'^g_{train}$, and $H'^h_{train}$ do not belong to the second label, and identify head images that are in the foregoing head images and that are of another sample other than "the sample identified by the second label".

S303b: The first clothing standardization detection apparatus performs model training by using the at least one second training sample group, to correct the model parameter of the branch network.

For example, the first clothing standardization detection apparatus performs iterative parameter learning based on the second sample training group E" and the redefined labels by using a gradient descent method and a back propagation method, to correct the model parameter of the branch network, and the target model having a head identification function.

It should be noted that for the upper body image, the first clothing standardization detection apparatus performs S303, to obtain the target model having an upper body identification function. For a processing process, refer to a processing process of the head image. Similarly, it should be noted that for the lower body image, the first clothing standardization detection apparatus performs S303, to obtain the target model having a lower body identification function. For a processing process, refer to the processing process of the head image. Details are not described herein again.

In this way, the first clothing standardization detection apparatus performs training based on the first training sample, to obtain a model parameter of the target model, so that the target model has a general feature identification capability. The first clothing standardization detection apparatus then performs training based on the second training sample, to adjust the model parameter of the branch network of the target model, and improve a local part identification capability of the target model. Because the target model can identify different features, the target model can be applied to different scenarios, and a model does not need to be separately trained for a specific scenario. This reduces model customization costs.

In the model application phase, the clothing standardization detection method includes the following three phases.

Figure 5:
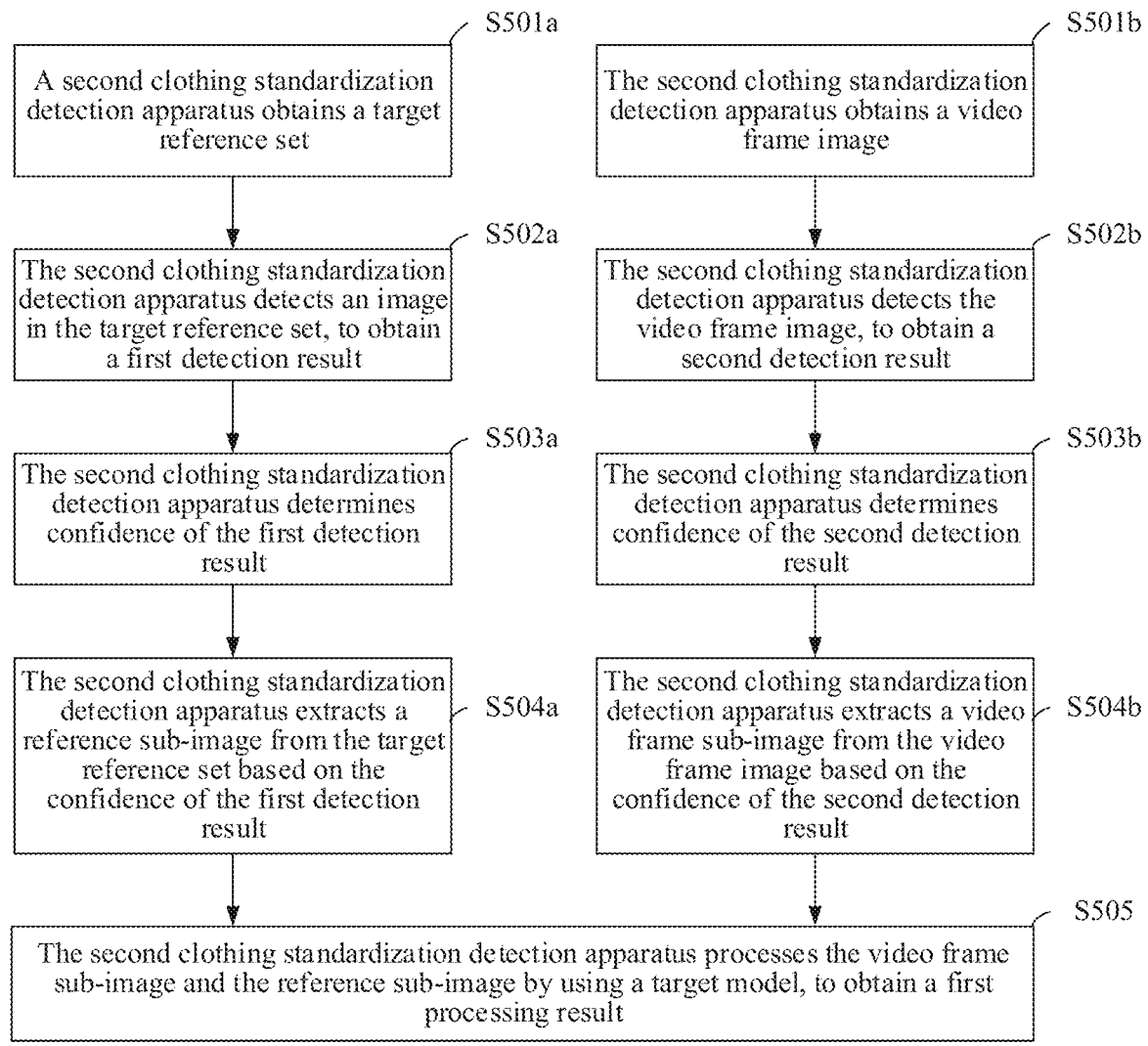
FIG. 5 is a schematic flowchart of another clothing standardization detection method according to an embodiment of this application.

A first phase is a target reference set preprocessing phase. In this phase, the second clothing standardization detection apparatus extracts a reference sub-image from an image in a target reference set. The second clothing standardization detection apparatus and the first clothing standardization detection apparatus may be the same or may be different. Refer to FIG. 5. The first phase includes the following steps.

S501a: The second clothing standardization detection apparatus obtains the target reference set.

The target reference set is used to provide a reference sub-image to a target model, so that the target model is used as a reference, to complete a task. The target model is a model obtained in the "model training phase". The target reference set includes an image of a standard wear style of a target part of a reference object in a first scenario, for example, an image of the standard wear style of the reference object at at least one angle, or an image of the standard wear style of the reference object at at least one brightness level. The first scenario may be, for example, but is not limited to, one of the following scenarios: a construction site, a dining hall kitchen, or a conference site. The reference object may be a person, an animal, or the like.

Figure 6:
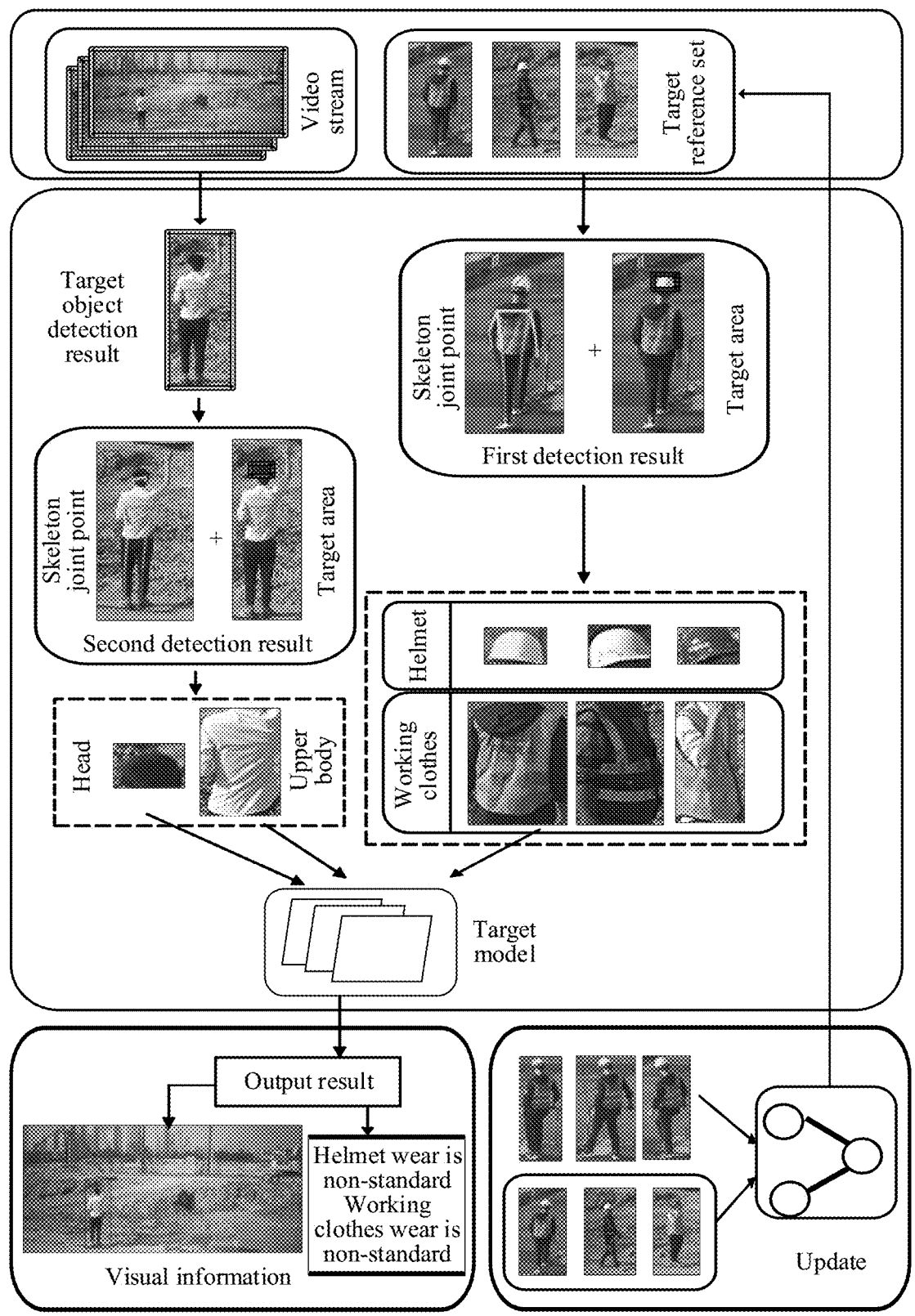
FIG. 6 is a schematic flowchart of still another clothing standardization detection method according to an embodiment of this application.

For example, when "the target reference set includes an image of the reference object", the target reference set includes $N_s$ images, and is denoted as $S=\{s_1, s_2, \ldots, s_{N_a}\}$. S represents the target reference set, $s_2$ represents a $1^{st}$ image in the target reference set, $s_2$ represents a $2^{nd}$ image in the target reference set, and $s_{N_a}$ represents an $N_a^{th}$ image in the target reference set. FIG. 6 is used as an example. A scenario shown in FIG. 6 is a "construction site". The target reference set includes three images.

When "the target reference set includes an image of the reference object", the second clothing standardization detection apparatus preprocesses an image in the target reference set (in other words, performs S502a to S504a), to obtain a reference sub-image, namely, the image of the standard wear style of the target part of the reference object in the first scenario. For descriptions of the "target part", refer to related descriptions of S301. Details are not described herein again.

S502a: The second clothing standardization detection apparatus detects the image in the target reference set, to obtain a first detection result.

The first detection result includes at least one of the following: a skeleton joint point of a target part in the target reference set, or first indication information. The first indication information indicates an area of the target part of the reference object in the image in the target reference set.

For example, $i \in \{1, 2, \ldots, N_s\}$. An image in the target reference set is used as an example. The image $1_3$, is input into a human body posture estimation model, to detect a skeleton joint point in a portrait, and obtain location information of the skeleton joint point in the image in the target reference set. The human body posture estimation model may be an AlphaPose model. The skeleton joint point may be, for example, but is not limited to, a joint point on the following target part: the left shoulder, the right shoulder, the left side of the hip, the right side of the hip, the left knee, the right knee, the left ankle, the right ankle, the nose tip, the left eye, the right eye, the left ear, or the right ear. Skeleton joint points shown in FIG. 6 are as follows: the left shoulder, the right shoulder, the left side of the hip, the right side of the hip, the left knee, the right knee, the left ankle, the right ankle, the left ear, and the right ear. The image $s_i$ is input into a target detection model, to obtain the first indication information. A target area (an area including the target part) detected by the target detection model is related to the first scenario. For example, in the "construction site" scenario, the target area is an area including the head, as shown in FIG. 6. The first indication information indicates an area of the target part in the image in the target reference set, for example, an area of the head in the image in the target reference set. The target detection model may be a YOLOv3 model.

S503a: The second clothing standardization detection apparatus determines confidence of the first detection result.

The confidence of the first detection result indicates a trustworthiness degree of the first detection result.

For example, the second clothing standardization detection apparatus determines the confidence of the first detection result with reference to the first detection result and the image in the target reference set. For a specific process, refer to a conventional technology. Details are not described herein again.

S504a: The second clothing standardization detection apparatus extracts the reference sub-image from the target reference set based on the confidence of the first detection result.

The reference sub-image includes an image of an area indicated by the first indication information, and confidence of a skeleton joint point in the area indicated by the first indication information meets a preset condition a. The preset condition a may be, for example, but is not limited to, at least one of the following items.

A first item is that the confidence of the skeleton joint point in the area indicated by the first indication information is greater than a confidence threshold a1. The confidence threshold a1 may be 0.1 or 0.3, or the confidence threshold a1 may be another value.

A second item is that in the area indicated by the first indication information, a quantity of skeleton joint points whose confidence is greater than the confidence threshold a1 exceeds a specific quantity, for example, greater than a quantity threshold a2. The quantity threshold a2 may be 4, or the quantity threshold a2 may be another value.

For example, the second clothing standardization detection apparatus performs the following steps.

Step 1a: If a largest value of vertical coordinates of four points of the left shoulder, the right shoulder, the left side of the hip, and the right side of the hip in the skeleton joint points is greater than a smallest value of vertical coordinates of six points of the left side of the hip, the right side of the hip, the left knee, the right knee, the left ankle, and the right ankle, it indicates that the portrait in the image $s_i$ is an image with the bending waist, and the second clothing standardization detection apparatus discards the image $s_i$, to filter out a human body posture that is difficult to identify, and avoid an identification error. Otherwise, the second clothing standardization detection apparatus performs at least one of step 2a, step 3a, and step 4a.

Step 2a: Use, as an upper body clothing area, a minimum bounding rectangle of a quadrilateral formed by the four points of the left shoulder, the right shoulder, the left side of the hip, and the right side of the hip in the skeleton joint points. If a quantity of joint points whose confidence is greater than the confidence threshold a1 (for example, 0.1) in the four joint points is less than 3, the second clothing standardization detection apparatus discards the area. Otherwise, the second clothing standardization detection apparatus uses the area as the upper body clothing area, to be specific, the area includes a reference sub-image of a standard wear style of the upper body in the first scenario.

For example, a reference sub-image extracted from the image is denoted as $\hat{S}_i = \{\hat{s}_i^1\}$. $\hat{S}_i$ represents the reference sub-image extracted from the image $s_i$, and $\hat{s}_i^1$ represents a reference sub-image of a $1^{st}$ target part (for example, the upper body) extracted from the image $s_i$.

It should be noted that step 2a is an optional step. When the target part includes the upper body, the second clothing standardization detection apparatus performs step 2a. When the target part does not include the upper body, the second clothing standardization detection apparatus does not perform step 2a.

Step 3a: Use, as a lower body clothing area, a minimum bounding rectangle of a polygon formed by six points of the left side of the hip, the right side of the hip, the left knee, the right knee, the left ankle, and the right ankle in the skeleton joint points. If a quantity of joint points whose confidence is greater than the confidence threshold a1 (for example, 0.1) in the six joint points is less than 5, the second clothing standardization detection apparatus discards the area. Otherwise, the second clothing standardization detection apparatus uses the area as the lower body clothing area, to be specific, the area includes a reference sub-image of a standard wear style of the lower body in the first scenario.

For example, a reference sub-image extracted from the image s is denoted as $\hat{S}_i = \{\hat{s}_i^2\}$. $\hat{S}_i$ represents the reference sub-image extracted from the image $s_i$, and $\hat{s}_i^2$ represents a reference sub-image of a $2^{nd}$ target part (for example, the lower body) extracted from the image $s_i$.

It should be noted that step 3a is an optional step. When the target part includes the lower body, the second clothing standardization detection apparatus performs step 3a. When the target part does not include the lower body, the second clothing standardization detection apparatus does not perform step 3a.

Step 4a: In the area (for example, the area of the head) indicated by the first indication information, the skeleton joint points include joint points of the following five parts: the middle nose tip, the left ear, the right ear, the left eye, and the right eye. If a quantity of joint points whose confidence is greater than a confidence threshold a1 (for example, 0.1) in the five joint points is less than a quantity threshold a2 (for example, 4), the second clothing standardization detection apparatus discards the area indicated by the first indication information. Otherwise, the second clothing standardization detection apparatus determines whether confidence of the area indicated by the first indication information meets a requirement. If the confidence of the area indicated by the first indication information is less than a confidence threshold a1 (for example, 0.3), the second clothing standardization detection apparatus discards the area indicated by the first indication information. Otherwise, the second clothing standardization detection apparatus uses the area as the area of the head, to be specific, the area includes a reference sub-image of a standard wear style of the head in the first scenario.

For example, a reference sub-image extracted from the image gi is denoted as $\hat{S}_i = \{\hat{s}_i^3\}$. $\hat{S}_i$ represents the reference sub-image extracted from the image $s_i$, and $\hat{s}_i^3$ represents a reference sub-image of a $3^{rd}$ target part (for example, the head) extracted from the image $s_i$.

It should be noted that step 4a is an optional step. When the target part includes the head, the second clothing standardization detection apparatus performs step 4a. When the target part does not include the head, the second clothing standardization detection apparatus does not perform step 4a.

Figure 7:
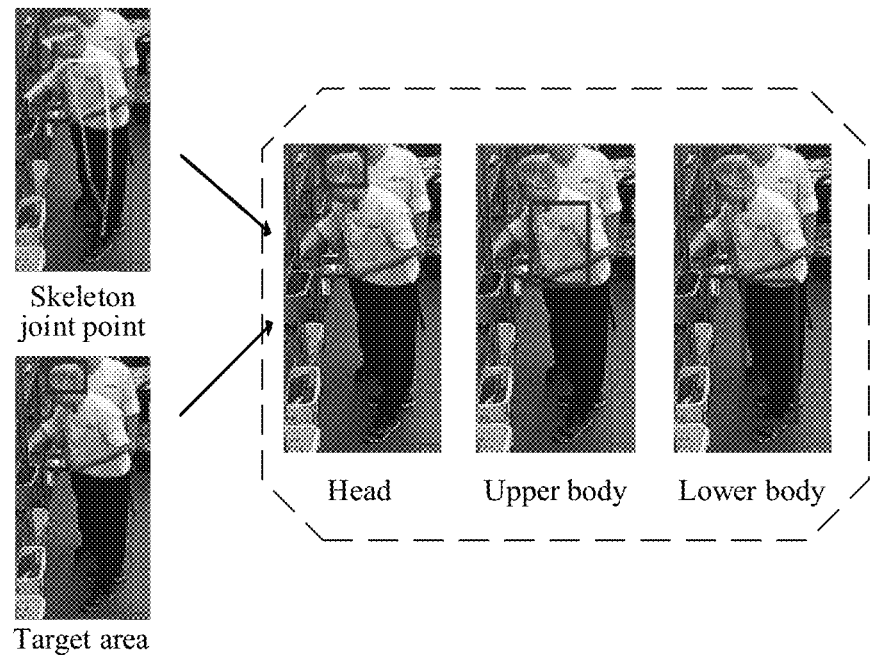
FIG. 7 is a schematic diagram of a reference sub-image according to an embodiment of this application.

For example, when the target part includes the upper body, the lower body, and the head, the second clothing standardization detection apparatus performs step 2a, step 3a, and step 4a, and reference sub-images extracted from the image $s_i$ in the target reference set are denoted as $\hat{S}_i$, $\{\hat{s}_i^1, \hat{s}_i^2, \hat{s}_i^3\}$. As shown in FIG. 7, a scenario shown in FIG. 7 is a "dining hall kitchen", and reference sub-images obtained by the second clothing standardization detection apparatus are as follows: a sub-image of the head wearing a sanitary cap, a sub-image of the upper body wearing a sanitary suit, and a sub-image of the lower body wearing a sanitary suit. When i traverses $\{1, 2, \ldots, N_s\}$, the second clothing normalization detection apparatus may extract more reference sub-images from the image in the target reference set.

The reference sub-images are denoted as $\hat{S}_i$, $\{\hat{s}_1^1, \hat{s}_2^1, \ldots, \hat{s}_{N_a}^1, \hat{s}_1^2, \hat{s}_2^2, \ldots, \hat{s}_N^2, \hat{s}_1^3, \hat{s}_2^3, \ldots, \hat{s}_{N_a}^3\}$.

It should be noted that processing steps of "S502a to S504a" are optional. When "the target reference set includes an image of the reference object", the second clothing standardization detection apparatus performs at least one processing step in "S502a to S504a", to obtain a reference sub-image. When "the target reference set is a set of reference sub-images", to be specific, the image in the target reference set is an extracted reference sub-image of the standard wear style of the target part in the first scenario, the second clothing standardization detection apparatus may obtain a reference sub-image without performing processing steps "S502a to S504a".

A second phase is a video frame image processing phase. In this phase, the second clothing standardization detection apparatus extracts a video frame sub-image from a video frame image.

S501b: The second clothing standardization detection apparatus obtains the video frame image.

The video frame image includes an image of a target object in the first scenario. The target object may be a person, an animal, or the like. The first scenario may be, for example, but is not limited to, one of the following scenarios: a construction site, a dining hall kitchen, or a conference site. The target object includes at least one target part. For descriptions of the "target part", refer to related descriptions of S301. Details are not described herein again. The video frame sub-image includes an image of the target part of the target object. Therefore, the video frame image includes at least one video frame sub-image.

For example, a first device 101 acquires a video stream, and transmits the video stream to the second clothing standardization detection apparatus. The video stream includes a plurality of frames of video frame images, namely, images of the target object in the first scenario. For example, the video stream is denoted as $I=\{I_1, I_2, \ldots, I_T\}$. I represents the video stream, $I_1$ represents a video frame image at a moment 1 in the video stream, $I_2$ represents a video frame image at a moment 2 in the video stream, and $I_T$ represents a video frame image at a moment T in the video stream. In S501b, the video frame image obtained by the second clothing standardization detection apparatus may be a video frame image at a moment (for example, a moment t) in the video stream, where a video frame image at the moment t is denoted as $I_t$.

S502b: The second clothing standardization detection apparatus detects the video frame image, to obtain a second detection result.

The second detection result includes at least one of the following: a skeleton joint point of the target part of the target object in the video frame image, or second indication information. The second indication information indicates an area of the target part of the target object in the video frame image.

For example, the video frame image $I_t$ is input into a target object detection model, to detect a portrait in the video frame image $I_t$, and obtain a target object detection result, which is denoted as $P_t$, $\{p_t^1, p_t^2, \ldots, p_t^{N_p}\}$. $p_t^2$ represents a $1^{st}$ portrait in the video frame image $I_t$, $p_t^2$ represents a $2^{nd}$ portrait in the video frame image $I_t$, and $p_t^{N_p}$ represents an $N_p$ portrait in the video frame image $I_t$. In FIG. 6, "a portrait" is used as an example to show a "target object detection result".

When $t' \notin \{1, 2, \ldots, N_p\}$, a portrait $p_t^{t'}$ in the video frame image $I_t$ is used as an example. The portrait $p_t^{t'}$ is input into a human body posture estimation model, to detect a skeleton joint point in the portrait $p_t^{t'}$, and obtain location information of the skeleton joint point in the video frame image $I_t$. Refer to an image of the skeleton joint point in a box in which the second detection result is located in FIG. 6. The portrait $p_t^{t'}$ is input into a target detection model, to obtain the second indication information. For details, refer to an image of a target area in FIG. 6. For a specific implementation process of S502b, refer to related descriptions of S502a. Details are not described herein again.

S503b: The second clothing standardization detection apparatus determines confidence of the second detection result.

The confidence of the second detection result indicates a trustworthiness degree of the second detection result. Compared with an implementation process of S503a, an implementation process of S503b has the following difference: A processing object is the second detection result. For the implementation process of S503b, refer to related descriptions of S503a. Details are not described herein again.

S504b: The second clothing standardization detection apparatus extracts the video frame sub-image from the video frame image based on the confidence of the second detection result.

The video frame sub-image includes an image of an area indicated by the second indication information, and confidence of a skeleton joint point in the area indicated by the second indication information meets a preset condition b. The preset condition b may be, for example, but is not limited to, at least one of the following items.

A first item is that the confidence of the skeleton joint point in the area indicated by the second indication information is greater than a confidence threshold b1. The confidence threshold b1 may be 0.1 or 0.3, or the confidence threshold b1 may be another value. The confidence threshold b1 may be the same as or different from the confidence threshold a1. This is not limited in this embodiment of this application.

A second item is that in the area indicated by the second indication information, a quantity of skeleton joint points whose confidence is greater than the confidence threshold b1 exceeds a specific quantity, for example, greater than a quantity threshold b2. The quantity threshold b2 may be 4, or the quantity threshold b2 may be another value. The quantity threshold b2 may be the same as or different from the quantity threshold b1. This is not limited in this embodiment of this application.

For example, for information about the skeleton joint point and the second indication information that are obtained from the portrait $p_t^{t'}$, the second clothing standardization detection apparatus performs processing, to obtain a video frame sub-image of a target part in the portrait $p_t^{t'}$, as shown by images of the "head" and the "upper body" in FIG. 6. Compared with an implementation process of S504a, an implementation process of S504b has the following difference: A processing object is the second detection result. For the specific process, refer to related descriptions of S504a. Details are not described herein again. When the target part includes the upper body, the lower body, and the head, video frame sub-images extracted by the second clothing standardization detection apparatus from the portrait p are denoted as $\hat{p}_t^{t'} = \{\hat{p}_t^{t'1}, \hat{p}_t^{t'2}, \hat{p}_t^{t'3}\}$. $\hat{p}_t^{t'}$ represents the video frame sub-images extracted from the portrait $p_t^{t'}$, $\hat{p}_t^{t'1}$ represents a video frame sub-image of a $1^{st}$ target part (for example, the upper body) extracted from the portrait $p_t^{t'}$, $\hat{p}_t^{t'2}$ represents a video frame sub-image of a $2^{nd}$ target part (for example, the lower body) extracted from the portrait $p_t^{t'}$, and $\hat{p}_t^{t'3}$ represents a video frame sub-image of a $3^{rd}$ target part (for example, the head) extracted from the portrait $p_t^{t'}$. When traverses $\{1, 2, \ldots, N_p\}$, the second clothing standardization detection apparatus may extract video frame sub-images from the video frame image $I_t$.

In this way, the second clothing standardization detection apparatus can detect a skeleton joint point and an area in which the target part is located in the video frame image, and locate the target part with reference to detection information of the skeleton joint point and the area in which the target part is located, to resolve a disadvantage that skeleton joint point detection is not precise. This helps improve processing precision of a target model.

It should be noted that the second clothing standardization detection apparatus may first perform the processing steps of the "first phase", and then perform the processing steps of the "second phase". Alternatively, the second clothing standardization detection apparatus may first perform the processing steps of the "second phase", and then perform the processing steps of the "first phase". Alternatively, the second clothing standardization detection apparatus may simultaneously perform the processing steps of the "first phase" and the "second phase". This is not limited in this embodiment of this application.

A third phase 3 is an identification phase. In this phase, the second clothing standardization detection apparatus determines a first processing result. The first processing result indicates a similarity between a first wear style of the target object in the video frame image and a standard wear style of the reference object in the reference sub-image. For example, a similarity is represented by using a distance between feature vectors. A smaller distance indicates a higher similarity that is represented. On the contrary, a larger distance indicates a lower similarity that is represented.

S505: The second clothing standardization detection apparatus processes the video frame sub-image and the reference sub-image by using the target model, to obtain the first processing result.

The target model is a model obtained in the model training phase, has a general feature identification capability, and is irrelevant to the first scenario. For example, the target model can identify the head, the upper body, the lower body, a hand, a color, or the like. The target model can determine, based on the reference sub-image, a wear style used by the target model to identify the target part. In other words, the target model uses the reference sub-image as a reference, to determine specific features that the target model is used to identify. For example, when the reference sub-image includes the head, the target model determines that the specific features that the target model is used to identify include a wear style of the "head". When the reference sub-image includes the upper body, the target model determines that the specific features that the target model is used to identify include a wear style of the "upper body".

For example, an implementation process of S505 is as follows.

For example, when "the target part includes the upper body", input information of the target model includes the following two items: a video frame sub-image $\hat{p}_t^{t'1}$ and a reference sub-image $\hat{S}_i$, $\{\hat{s}_1^1, \hat{s}_1^2, \ldots, \hat{s}_{N_s}^1\}$. The target model extracts a feature vector of the video frame sub-image $\hat{p}_t^{t'1}$, and the feature vector is denoted as $f(\hat{p}_t^{t'1})$. The target model extracts a feature vector of a reference sub-image $\{\hat{s}_1^1, \hat{s}_2^1, \ldots, \hat{s}_{N_s}^1\}$ including a head image, and the feature vector is denoted as $f(\hat{S})=\{f(\hat{s}_1^1), f(\hat{s}_2^1) \ldots, f(\hat{s}_{N_s}^1)\}$. A minimum distance $d(\hat{p}_t^1)$ between the video frame sub-image $\hat{p}_t^{t'1}$ and the reference sub-image $\{\hat{s}_1^1, \hat{s}_2^1, \ldots, \hat{s}_{N_s}^1\}$ is calculated. The minimum distance $d(\hat{p}_t^1)$ satisfies:

$$d(\hat{p}_t^1) = \min_{j=1,\ldots,N_2} D(f(\hat{p}_t^1), f(\hat{s}_j^1))$$ Formula (3)

$d(\hat{p}_t^1)$ represents the minimum distance between the video frame sub-image $\hat{p}_t^{t'1}$ and the reference sub-image $\{\hat{s}_1^1, \hat{s}_1^2, \ldots, \hat{s}_{N_s}^1\}$, $d(\hat{p}_t^1)$ represents the feature vector of the video frame sub-image $\hat{p}_t^1$, $f(\hat{s}_j^1)$ represents the feature vector of the reference sub-image $\hat{s}_j^1$, and D(•) represents a distance metric, for example, a Euclidean distance calculation method.

For another example, when "the target part includes the lower body", the target model performs the foregoing process, to obtain a minimum distance $d(\hat{p}_t^2)$ between the video frame sub-image $\hat{p}_t^{t'2}$ and the reference sub-image $\{\hat{s}_1^2, \hat{s}_2^2, \ldots, \hat{s}_{N_s}^2\}$. For details, refer to a processing process of the "minimum distance $d(\hat{p}_t^1)$". Details are not described herein again.

For still another example, when "the target part includes the head", the target model performs the foregoing process, to obtain a minimum distance $d(\hat{p}_t^2)$ between the video frame sub-image $\hat{p}_t^{t'3}$ and the reference sub-image $\{\hat{s}_1^1, \hat{s}_1^2, \ldots, \hat{s}_{N_s}^1\}$. For details, refer to a processing process of the "minimum distance $d(\hat{p}_t^1)$". Details are not described herein again.

To sum up, when the target part includes the upper body, the lower body, and the head, for the portrait $\hat{p}_t^{t'}$ in the video frame image $I_t$, the second clothing standardization detection apparatus obtains a distance of each part $\hat{d}_t^{t'}=\{(\hat{p}_t^1), d(\hat{p}_t^2), d(\hat{p}_t^3)\}$ of the portrait $\hat{p}_t^{t'}$. The second clothing standardization detection apparatus performs tracking processing on the target object in the portrait $\hat{p}_t^{t'}$ by integrating the plurality of frames of video frame images in the video stream, to obtain a distance of the target object in the video stream I, where the distance is denoted as $\hat{p}_t^{t'}=\{(\hat{p}_1^{t'}), d(\hat{p}_2^{t'}), \ldots, d(\hat{p}_T^{t'})\}$. $\hat{p}^{t'}$ represents a distance between a first wear style and a standard wear style of each part of the target object in the portrait $p_t^{t'}$ in the video stream I, $d(\hat{p}_1^{t'})$ represents a distance between the first wear style and the standard wear style of each part of the target object in the portrait $\hat{p}_t^{t'}$ at a moment 1 in the video stream I, $d(\hat{p}_2^{t'})$ represents a distance between the first wear style and the standard wear style of each part of the target object in the portrait $\hat{p}_t^{t'}$ at a moment 2 in the video stream I, and $d(\hat{p}_T^{t'})$ represents a distance between the first wear style and the standard wear style of each part of the target object in the portrait $p_t^{t'}$ at a moment T in the video stream I.

Figure 8:
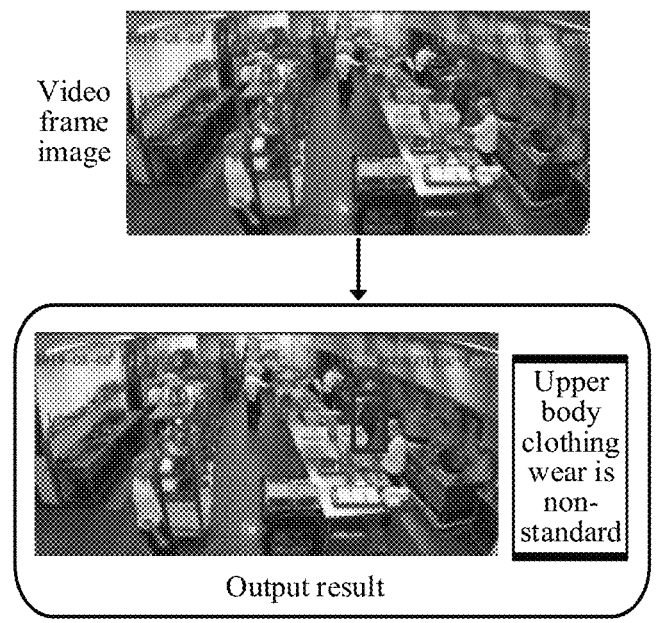
FIG. 8 is a schematic diagram of an output result according to an embodiment of this application.

For a part, if distances at three consecutive moments are greater than a distance threshold (for example, 0.6), the second clothing standardization detection apparatus determines that a wear style of the part in the portrait $p_t^{t'}$ is non-standard. For a target object that is determined as having unstandardized wear, an output result of the second clothing standardization detection apparatus may be, for example, but is not limited to, the following information: visual information. For example, in the video frame image, a rectangular box is used to identify a target object having unstandardized wear (as shown in FIG. 6), or a target part that is of the target object and that has unstandardized wear (a text prompt of "helmet wear is non-standard or working clothes wear is non-standard" in FIG. 6). Alternatively, as shown in FIG. 8, in a "dining hall kitchen" scenario, for a frame of video frame image, an output result of the second clothing standardization detection apparatus is as follows: A box is used to identify a staff member who has unstandardized wear, and text prompt information "upper body clothing wear is non-standard" is output.

According to the clothing standardization detection method provided in this embodiment of this application, the target model processes a video frame sub-image and a reference sub-image by using, as a reference, an image that is of a standard wear style of a target part of a reference object in a first scenario and that is provided by the reference sub-image, to determine a similarity between a first wear style and a target wear style of a target part of a target object in the video frame sub-image in the first scenario. Because the target model has a general feature identification capability, in different scenarios, the target model uses the reference sub-image as a reference to determine a feature that the target model is used to identify, for example, a wear style of the target part, so as to determine a similarity between the first wear style and the target wear style of the target part in the first scenario. In other words, even if a scenario change occurs, the target model does not need to be trained for a "scenario after the change", and the target model can complete a task based on a reference sub-image in the "scenario after the change". This reduces the model customization costs and improves the accuracy of clothing standardization detection.

It should be noted that "a frame of video frame image $I_t$" is used as an example in the foregoing, to show each processing process of the second clothing standardization detection apparatus. In a processing process for "a video stream I" or "different video streams", the target reference set is a set that is updated under a specific condition, so that the reference sub-image more fits an actual scenario, and accuracy of a similarity determined by the target model is improved. For example, refer to FIG. 9. A process of "obtaining a target reference set" may include the following steps.

Step a1: The second clothing standardization detection apparatus determines a first candidate set.

Figure 10:
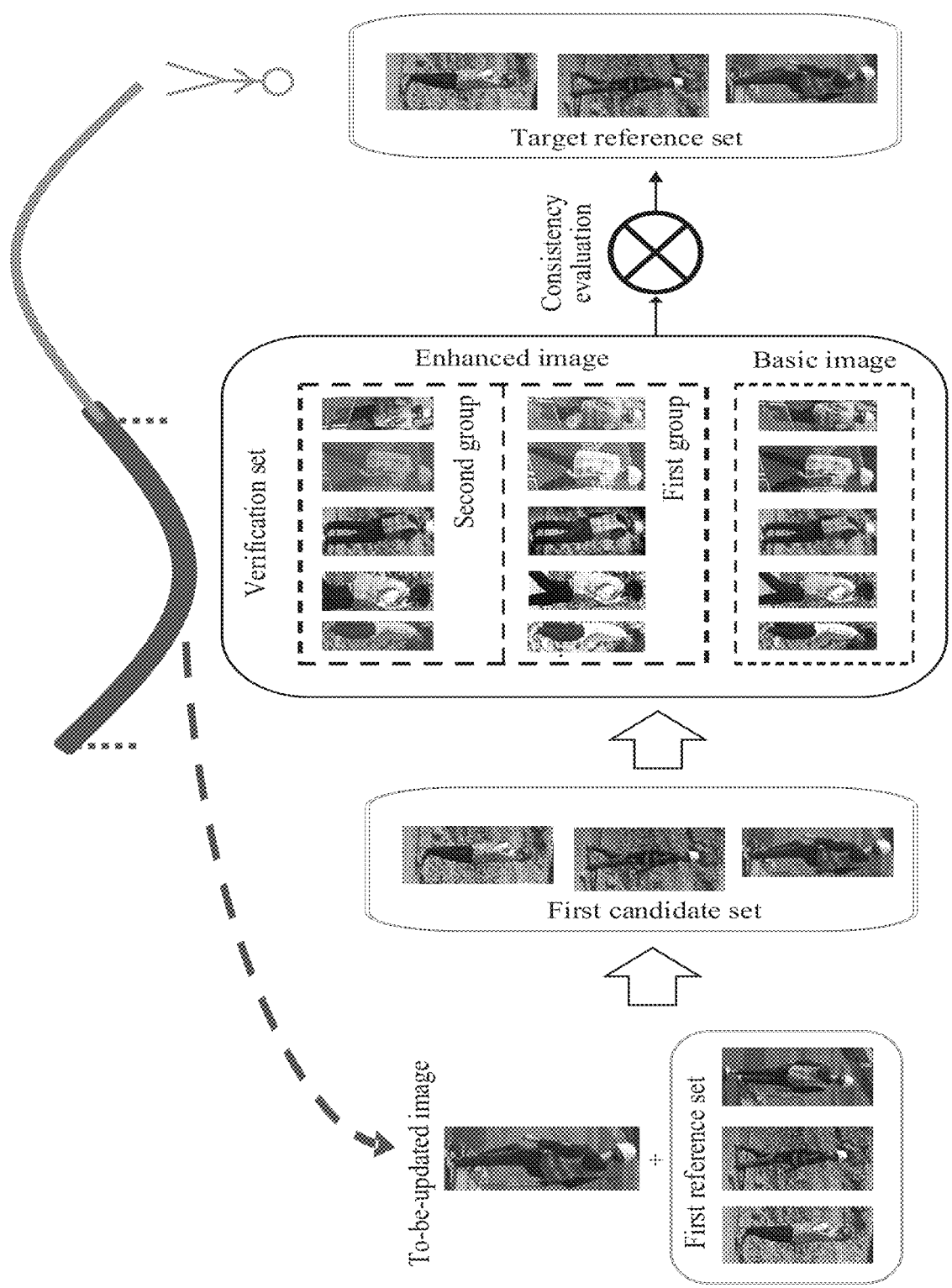
FIG. 10 is a schematic flowchart of still another clothing standardization detection method according to an embodiment of this application.

The first candidate set is a set in a candidate set, the candidate set includes at least one set, and the at least one set includes a target reference set. The first candidate set includes a first portion of images and a second portion of images, as shown in FIG. 10. The two portions of images are described as follows.

The first portion of images are the same as images in a first reference set. The first reference set is a set that provides reference sub-images to a target model before the target reference set is determined, and may be denoted as L={l1, l2, . . . , ln}. L represents the first reference set, l1 represents a $1^{st}$ image in the first reference set, l2 represents a $2^{nd}$ image in the first reference set, and ln represents an $n^{th}$ image in the first reference set.

The second portion of images are selected from a to-be-updated image set S. A second wear style and a standard wear style in an image in the to-be-updated image set S meet a preset condition. The preset condition includes at least one of the following items.

A first item is that a similarity between the second wear style and the standard wear style is greater than a similarity threshold x1.

For example, that "the second clothing standardization detection apparatus stores a historically obtained video frame sub-image" is used as an example. If the second clothing standardization detection apparatus determines that a similarity between the second wear style and the standard wear style in a video frame image (or a video frame sub-image) is greater than the similarity threshold x1, the second clothing standardization detection apparatus determines to store the video frame image (or the video frame sub-image) as an image in the to-be-updated image set S.

A second item is that the similarity between the second wear style and the standard wear style meets a preset status in similarity distribution. The similarity distribution includes similarities between the second wear style and the standard wear style at a plurality of moments.

For example, that "the second clothing standardization detection apparatus stores a historically obtained video frame sub-image" is used as an example. In an example, if the second clothing standardization detection apparatus determines that similarities between the second wear style and the standard wear style in video frame images (or video frame sub-images) at at least three moments in a video stream are less than a similarity threshold x2 (for example, 0.4), and a similarity between the second wear style and the standard wear style in a video frame image (or a video frame sub-image) at at least one moment is greater than a similarity threshold x3, the second clothing standardization detection apparatus determines to store the video frame image (or the video frame sub-image) as an image in the to-be-updated image set S.

In another example, if the second clothing standardization detection apparatus determines that similarities between the second wear style and the standard wear style in video frame images (or video frame sub-images) at at least three moments in a video stream are less than a similarity threshold x2 (for example, 0.4), and determines that a target part in the video stream has "unstandardized wear", the second clothing standardization detection apparatus determines a video frame image (or a video frame sub-image) with a lowest similarity between the second wear style and the standard wear style of the target part in the video stream, as an image in the to-be-updated image set S. FIG. 10 is used as an example. A curve in FIG. 10 shows a similarity change of a verification object in a time period. A thin curve represents a time period in which a similarity is lower than the similarity threshold x2, and a thick curve represents a time period in which a similarity is higher than the similarity threshold x2. A to-be-updated image includes a frame of video frame image with a highest similarity.

Step a2: The second clothing standardization detection apparatus determines a verification set.

The verification set includes at least one of the following: wear images of the target part at at least two angles in the first scenario, or wear images of the target part at at least two brightness levels in the first scenario.

For example, the second clothing standardization detection apparatus pre-stores a specific quantity of images of a moving track of the verification object. First, the second clothing standardization detection apparatus extracts sub-images of the target part from the images of the moving track of the verification object, to form a basic image, as shown in FIG. 10. The basic image includes at least one of the following: a wear image of the target part at a first angle in the first scenario, or a wear image of the target part at a first brightness level in the first scenario. For example, the basic image is denoted as $\tilde{P}=\{\tilde{p}_1, \tilde{p}_2, \ldots, \tilde{p}_{50}\}$. $\tilde{P}$ represents the basic image, $\tilde{p}_1$ represents a $1^{st}$ image in the basic image, $\tilde{p}_2$ represents a $2^{nd}$ image in the basic image, and $\tilde{p}_{50}$ represents the fiftieth image in the basic image.

Then, the second clothing standardization detection apparatus randomly performs image enhancement on each image in the basic image, for example, performs angle transformation or brightness level transformation, to obtain at least an enhanced image. An enhanced image $\tilde{P}'$ includes at least one of the following: a wear image of the target part of the verification object at a second angle in the first scenario, or a wear image of the target part of the verification object at a second brightness level in the first scenario. An enhanced image $\tilde{P}''$ includes at least one of the following:

a wear image of the target part of the verification object at a third angle in the first scenario, or a wear image of the target part of the verification object at a third brightness level in the first scenario. For wear images in an enhanced image $\tilde{P}'$, the rest may be deduced by analogy. FIG. 10 shows only two groups of enhanced images, and the two groups of enhanced images are images obtained after brightness level transformation is performed on the basic image.

It should be noted that the second clothing standardization detection apparatus may first perform step a1, and then perform step a2. Alternatively, the second clothing standardization detection apparatus may first perform step a2, and then perform step a1. Alternatively, the second clothing standardization detection apparatus may perform step a1 and step a2 simultaneously. This is not limited in this embodiment of this application.

Step a3: The second clothing standardization detection apparatus processes the first candidate set and the verification set by using the target model, to obtain a second processing result.

The second processing result is a similarity that is between the wear images in the verification set and that is determined by using the first candidate set as a reference.

For example, first, the target model processes the verification set by using the first candidate set as a reference, to obtain a corresponding distance $d(\tilde{P})$, $d(\tilde{P}')$, $d(\tilde{P}'')$, . . . $d(\tilde{P})$, represents a similarity that is between wear images of the basic image in the verification set and that is determined by using the first candidate set as a reference. d($\tilde{P}'$) represents a similarity that is between wear images of the enhanced image $\tilde{P}$ in the verification set and that is determined by using the first candidate set as the reference.

d($\tilde{P}'^{;i}$) represents a similarity that is between wear images of the enhanced image $\tilde{P}'$ in the verification set and that is determined by using the first candidate set as the reference.

Similarity consistency of the verification set is then determined. The similarity consistency of the verification set satisfies:

$$\begin{cases} \text{Sim} = -\sum_{i=1}^{50} \text{Var}_i \\ \text{Var}_i = \text{Var}(d(\hat{P}), d(\tilde{p}^{;i}), d(\tilde{p}^{,}), \ldots) \end{cases} \quad \text{Formula (4)}$$

Sim represents the similarity consistency of the verification set, and Var(•) represents variance calculation.

Step a4: The second clothing standardization detection apparatus determines the first candidate set as the target reference set based on the similarity indicated by the second processing result.

For example, if "the similarity indicated by the second processing result is greater than a first threshold", the clothing standardization detection apparatus uses the first candidate set as the target reference set.

In other words, if the similarity indicated by the second processing result meets a requirement, the clothing standardization detection apparatus may use the first candidate set as the target reference set, and this more fits an actual scenario.

For another example, the second clothing standardization detection apparatus further performs step a0.

Step a0: The second clothing standardization detection apparatus processes the first reference set and the verification set by using the target model, to obtain a third processing result.

The third processing result is a similarity that is between wear images in the verification set and that is determined by using the first reference set as a reference.

In this case, step a4 is implemented as the following step: When "the similarity indicated by the second processing result is greater than the similarity indicated by the third processing result", the second clothing standardization detection apparatus uses the first candidate set as the target reference set. For example, the second clothing standardization detection apparatus replaces the first candidate set with the target reference set.

An environment factor in the first scenario dynamically changes. For example, when illumination in the first scenario changes, a brightness level of clothings worn on the target part may change. For another example, when an angle during image acquisition in the first scenario changes, a shape of the target part may change. The target reference set is a set determined based on a similarity, the similarity can evaluate validity of an update effect of the target reference set, for example, consistency of an identification result obtained when the target model identifies the verification set by using the target reference set as a reference, and the verification set is wear images of the verification object at different angles and different brightness levels in the first scenario. Therefore, the image in the target reference set more fits a brightness level and an angle in an actual scenario, and a reference sub-image provided by the target reference set to the target model also more fits the actual scenario. Because the target model executes a task by using the reference sub-image as a reference, processing precision of the target model is improved.

It should be noted that when "there is one candidate set", the second clothing standardization detection apparatus obtains the target reference set by performing the foregoing steps (step a0 to step a4).

When there are a plurality of candidate sets, the second clothing normalization detection apparatus performs the foregoing steps (step a0 to step a4) for each set in the candidate sets, to obtain the target reference set. At least one image in any two candidate sets is different. For example, the first reference set is denoted as L={l1, l2, ..., ln}. L represents the first reference set, l1 represents a $1^{st}$ image in the first reference set, l2 represents a $2^{nd}$ image in the first reference set, and En represents an $n^{th}$ image in the first reference set. There are n candidate sets. A first candidate set is denoted as $S_1=\{s_{pre}^k, l2, \ldots, ln\}$. $S_1$ represents the first candidate set, and $s_{pre}^k$ represents a $k^{th}$ image in a to-be-updated image set. A second candidate set is denoted as $S_2=\{l1, s_{pre}^k, \ldots, ln\}$. $S_2$ represents the second candidate set. An $n^{th}$ candidate set is denoted as $S_n=\{l1, l2, \ldots, s_{pre}^k\}$. $S_n$ represents an $n^{th}$ candidate set. In other words, the to-be-updated image $s_{pre}^k$ replaces each image in the first reference set one by one, to obtain a plurality of candidate sets.

The foregoing mainly describes the solutions provided in embodiments of this application from the perspective of the methods. With reference to the accompanying drawings, the following describes a clothing standardization detection apparatus 1020 and a second device 102 according to this application.

Refer to a schematic diagram of a structure of the clothing standardization detection apparatus 1020 in the system architectural diagram shown in FIG. 1. As shown in FIG. 1, the clothing standardization detection apparatus 1020 includes an obtaining unit 1021, a processing unit 1022, and a display unit 1023.

In a model application phase, the obtaining unit 1021 is configured to obtain a video frame sub-image and a reference sub-image. The video frame sub-image is from a video frame image in a first scenario, the video frame image includes an image of a target object, and the video frame sub-image includes an image of a first wear style of a target part of the target object in the first scenario. The reference sub-image is from a target reference set of the first scenario, the target reference set includes an image of a reference object, and the reference sub-image includes an image of a standard wear style of a target part of the reference object in the first scenario. The processing unit 1022 is configured to process the video frame sub-image and the reference sub-image by using a target model, to obtain a first processing result, where the target model is a trained artificial intelligence AI model, and the first processing result indicates a similarity between the first wear style of the target object and the standard wear style of the reference object.

For specific implementation of the obtaining unit 1021, refer to related content descriptions of S501a to S504a and S501b to S504b in the embodiment shown in FIG. 5. For specific implementation of the processing unit 1022, refer to related content descriptions of S505 in the embodiment shown in FIG. 5. Details are not described herein again.

In a possible design, the obtaining unit 1021 is specifically configured to: obtain the target reference set; detect an image in the target reference set, to obtain a first detection result, where the first detection result includes at least one of the following: a skeleton joint point of the target part of the reference object in the target reference set, or first indication information, where the first indication information indicates an area of the target part of the reference object in the image in the target reference set; determine confidence of the first detection result, where the confidence indicates a trustworthiness degree of the first detection result; and extract the reference sub-image from the image in the target reference set based on the confidence of the first detection result.

For specific implementation of the obtaining unit 1021, refer to related content descriptions of S501a to S504a in the embodiment shown in FIG. 5. Details are not described herein again.

In a possible design, the reference sub-image includes an image of an area indicated by the first indication information, and confidence of a skeleton joint point in the area indicated by the first indication information meets a first preset condition.

In a possible design, the obtaining unit 1021 is specifically configured to: obtain the video frame image; detect the video frame image, to obtain a second detection result, where the second detection result includes at least one of the following: a skeleton joint point of the target part of the target object in the video frame image, or second indication information, where the second indication information indicates an area of the target part of the target object in the video frame image; determine confidence of the second detection result, where the confidence indicates a trustworthiness degree of the second detection result; and extract the video frame sub-image from the video frame image based on the confidence of the second detection result.

For specific implementation of the obtaining unit 1021, refer to related content descriptions of S501b to S504b in the embodiment shown in FIG. 5. Details are not described herein again.

In a possible design, the video frame sub-image includes an image of an area indicated by the second indication information, and confidence of a skeleton joint point in the area indicated by the second indication information meets a second preset condition.

In a possible design, the target reference set includes at least one of the following: an image of the standard wear style of the reference object at at least one angle, or an image of the standard wear style of the reference object at at least one brightness level.

In a possible design, the target reference set is a reference set that is updated based on a similarity between wear images in a verification set. The verification set includes at least one of the following: wear images of the target part of a verification object at at least two angles in the first scenario, or wear images of the target part of the verification object at at least two brightness levels in the first scenario.

In a possible design, the processing unit 1022 is further configured to: process a first candidate set and the verification set by using the target model, to obtain a second processing result, where the first candidate set is a set in a candidate set, and the candidate set includes the target reference set; the verification set includes at least one of the following: wear images of the target part of the verification object at at least two angles in the first scenario, or wear images of the target part of the verification object at at least two brightness levels in the first scenario; and the second processing result is a similarity that is between the wear images in the verification set and that is determined by using the first candidate set as a reference; and determine, based on the similarity indicated by the second processing result, the first candidate set as the target reference set.

Figure 9:
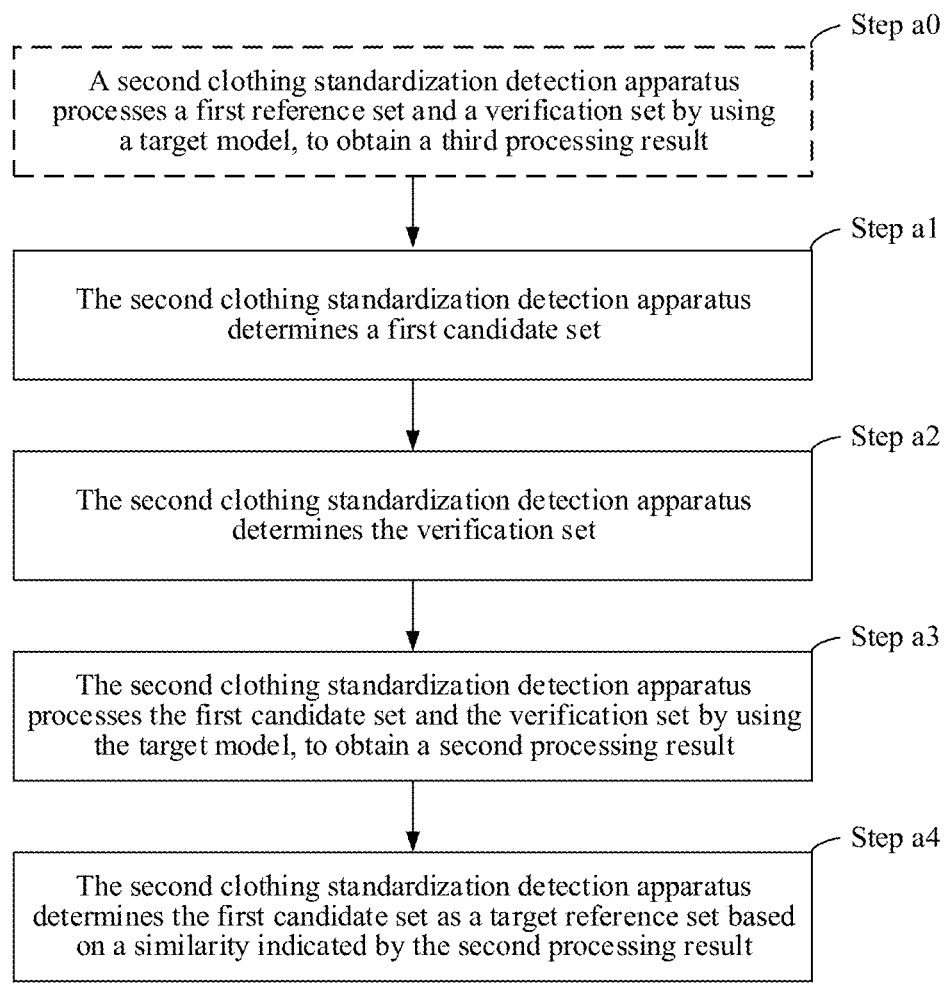
FIG. 9 is a schematic flowchart of still another clothing standardization detection method according to an embodiment of this application.

For specific implementation of the obtaining unit 1021, refer to related content descriptions of step a3 and step a4 in the embodiment shown in FIG. 9. Details are not described herein again.

In a possible design, the processing unit 1022 is further configured to process a first reference set and a verification set by using the target model, to obtain a third processing result. The first reference set is a set that provides a reference image to the target model before the target reference set is determined. The third processing result is a similarity that is between wear images in the verification set and that is determined by using the first reference set as a reference. That the processing unit 1022 is configured to determine, based on the similarity indicated by the second processing result, the first candidate set as the target reference set includes: If the similarity indicated by the second processing result is greater than the similarity indicated by the third processing result, the processing unit 1022 is configured to use the first candidate set as the target reference set, so that the image in the target reference set more fits the first scenario.

For specific implementation of the obtaining unit 1021, refer to related content descriptions of step a0 and step a4 in the embodiment shown in FIG. 9. Details are not described herein again.

In a possible design, that the processing unit 1022 is configured to determine, based on the similarity indicated by the second processing result, the first candidate set as the target reference set includes: If the similarity indicated by the second processing result is greater than a first threshold, the processing unit 1022 is configured to use the first candidate set as the target reference set, so that the image in the target reference set more fits the first scenario.

In a possible design, the first candidate set includes an image of a second wear style of the target part of the reference object in the first scenario. The image of the second wear style meets at least one of the following: a similarity between the second wear style and the standard wear style is greater than a second threshold; or a similarity between the second wear style and the standard wear style meets a preset status in similarity distribution. The similarity distribution includes similarities between the second wear style and the standard wear style at a plurality of moments.

In a possible design, the clothing standardization detection apparatus further includes: a display unit 1023, configured to provide visual information to a user, where the visual information includes at least one of the following: the similarity indicated by the first processing result, identifying a target object whose similarity of the first processing result is lower than a first threshold, or identifying a target part whose similarity of the first processing result is lower than a second threshold.

In a model training phase, the obtaining unit 1021 is configured to obtain a first training sample and a second training sample. The first training sample includes an image of at least one sample, the second training sample includes an image of at least one wear style of a target part of the sample, and the sample includes the target part. The processing unit 1022 is configured to perform model training by using the first training sample, to obtain a model parameter of a backbone network and a model parameter of a branch network. The processing unit 1022 is further configured to perform model training by using the second training sample, to correct the model parameter of the branch network, and obtain a target model.

For specific implementation of the obtaining unit 1021, refer to related content descriptions of S301 in the embodiment shown in FIG. 3. For specific implementation of the processing unit 1022, refer to related content descriptions of S302 and S303 in the embodiment shown in FIG. 3. Details are not described herein again.

In a possible design, the processing unit 1022 is specifically configured to: group the first training sample into at least one first training sample group, where the first training sample group includes a first positive-class sample and a first negative-class sample; and the first positive-class sample includes an image identified with a first label, the first negative-class sample includes an image not identified with the first label, and the first label indicates one of the at least one sample; and perform model training by using the first training sample group, to obtain the model parameter of the backbone network and the model parameter of the branch network.

For specific implementation of the processing unit 1022, refer to related content descriptions of S302a and S302b in the embodiment shown in FIG. 4a. Details are not described herein again.

In a possible design, the processing unit 1022 is specifically configured to: group the second training sample into at least one second training sample group, where the second training sample group includes a second positive-class sample and a second negative-class sample; and the second positive-class sample includes an image identified with a second label, the second negative-class sample includes an image not identified with the second label, and the second label indicates one of the at least one wear style; and perform model training by using the second training sample group, to correct the model parameter of the branch network.

For specific implementation of the processing unit 1022, refer to related content descriptions of S303a and S303b in the embodiment shown in FIG. 4b. Details are not described herein again.

The clothing standardization detection apparatus 1020 according to this embodiment of this application may correspondingly perform a method described in embodiments of this application, and the foregoing and other operations and/or functions of the modules in the clothing standardization detection apparatus 1020 are separately used to implement corresponding procedures of the methods in FIG. 3, FIG. 4a, FIG. 4b, FIG. 5, and FIG. 9. For brevity, details are not described herein again.

In addition, it should be noted that the embodiments described above are merely examples. The modules described as separate parts may or may not be physically separate, and parts displayed as modules may or may not be physical modules, may be located in one position, or may be distributed on a plurality of network modules. Some or all the modules may be selected based on actual needs to achieve the objectives of the solutions of embodiments of this application. In addition, in the accompanying drawings of the apparatus embodiments provided by this application, connection relationships between modules indicate that the modules have communication connections with each other, which may be specifically implemented as one or more communication buses or signal cables.

An embodiment of this application further provides a second device 102, configured to implement a function of the clothing standardization detection apparatus 1020 in the system architectural diagram shown in FIG. 1. The second device 102 may be a physical device or a physical device cluster, or may be a virtualized cloud device, for example, at least one cloud computing device in a cloud computing cluster. For ease of understanding, in this application, a structure of the second device 102 is described by using an example in which the second device 102 is an independent physical device.

Figure 11:
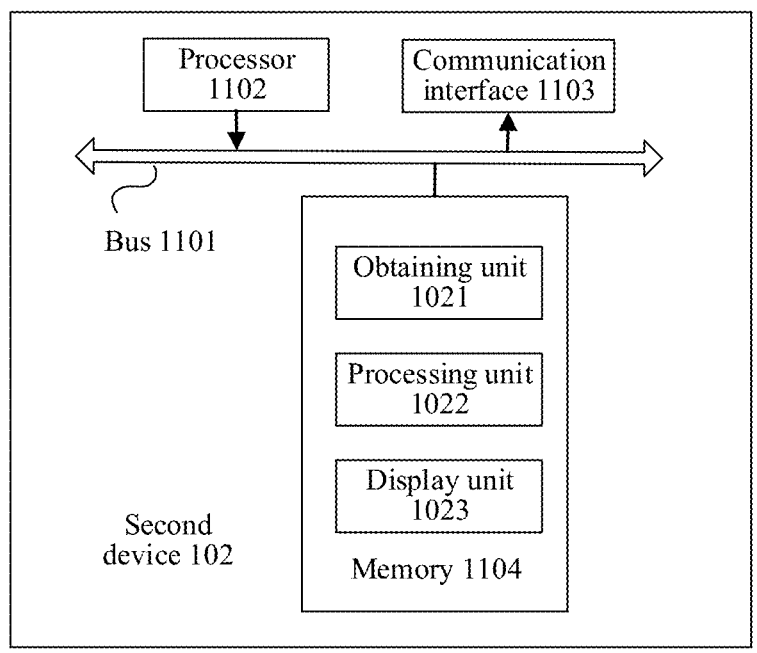
FIG. 11 is a schematic diagram of a structure of a device according to an embodiment of this application.

FIG. 11 is a schematic diagram of a structure of a second device 102. As shown in FIG. 11, the second device 102 includes a bus 1101, a processor 1102, a communication interface 1103, and a memory 1104. The processor 1102, the memory 1104, and the communication interface 1103 communicate with each other by using the bus 1101. The bus 1101 may be a peripheral component interconnect (PCI) bus, an extended industry standard architecture (EISA) bus, or the like. Buses may be classified into an address bus, a data bus, a control bus, and the like. For ease of representation, only one thick line is used for representation in FIG. 11, but this does not mean that there is only one bus or only one type of bus. The communication interface 1103 is configured to communicate with the outside, for example, obtain a video frame image and a reference image.

The processor 1102 may be a central processing unit (CPU). The memory 1104 may include a volatile memory, for example, a random access memory (RAM). The memory 1104 may alternatively include a non-volatile memory, for example, a read-only memory (ROM), a flash memory, a hard disk drive (HDD), or a solid-state drive (SSD).

The memory 1104 stores executable code, and the processor 1102 executes the executable code to perform the clothing standardization detection method.

Specifically, when the embodiment shown in FIG. 1 is implemented and the modules of the clothing standardization detection apparatus 1020 described in the embodiment in FIG. 1 are implemented by using software, software or program code needed for performing functions of the obtaining unit 1021 and the processing unit 1022 in FIG. 1 is stored in the memory 1104. The processor 1102 executes program code corresponding to each module stored in the memory 1104, such as program code corresponding to the obtaining unit 1021 and the processing unit 1022, to extract a reference sub-image and a video frame sub-image, and obtain a first processing result. In this way, a similarity between a first wear style of a target object and a standard wear style of a reference object is calculated, to implement clothing standardization detection.

Certainly, the code needed for executing a function of the display unit 1023 may also be stored in the memory 1104. The processor 1102 may further execute program code needed by a function of the display unit 1023, so that the display unit 1023 provides visual information to a user, so that the user conveniently browses a clothing standardization detection result.

An embodiment of this application further provides a computer-readable storage medium. The computer-readable storage medium includes instructions, and the instructions instruct a second device 102 to perform the clothing standardization detection method applied to the clothing standardization detection apparatus 1020.

An embodiment of this application further provides a computer program product. When the computer program product is executed by a computer, the computer performs any one of the foregoing clothing standardization detection methods. The computer program product may be a software installation package. If any one of the foregoing street abnormal event detection methods needs to be used, the computer program product may be downloaded, and the computer program product may be executed on the computer.

Based on the descriptions of the foregoing implementations, a person skilled in the art may clearly understand that this application may be implemented by using software in addition to necessary universal hardware, or certainly may be implemented by using dedicated hardware, including a dedicated integrated circuit, a dedicated CPU, a dedicated memory, a dedicated component, and the like. Generally, all functions that can be performed by a computer program can be easily implemented by using corresponding hardware. Moreover, there may be various specific hardware structures, such as an analog circuit, a digital circuit, and a dedicated circuit, used to achieve a same function. However, as for this application, software program implementation is a better implementation in most cases. Based on such an understanding, the technical solutions of this application essentially or the part contributing to a conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium, or the like.

What is claimed is:

1. A method, comprising:
    obtaining a video frame sub-image and a reference sub-image, wherein the video frame sub-image is from a video frame image of a first scenario, the video frame image comprises an image of a target object, the video frame sub-image comprises an image of a first wear style of a target part of the target object in the first scenario, the reference sub-image is from a target reference set of the first scenario, the target reference set comprises an image of a reference object, the reference sub-image comprises an image of a standard wear style of the target part of the reference object in the first scenario, the obtaining a reference sub-image comprises obtaining the target reference set and detecting an image in the target reference set to obtain a first detection result, and the first detection result comprises a skeleton joint point of the target part of the reference object in the target reference set; and
    processing the video frame sub-image and the reference sub-image by using a target model, to obtain a first processing result, wherein the target model is a trained artificial intelligence (AI) model, the target model is applied to a second scenario different from the first scenario without retraining specifically for the second scenario and the first processing result indicates a similarity between the first wear style of the target part of the target object and the standard wear style of the target part of the reference object.

2. The method according to claim 1, wherein the first detection result further comprises first indication information, the first indication information indicates an area of the target part of the reference object in the image in the target reference set, and the obtaining a reference sub-image further comprises:
    determining confidence of the first detection result, wherein the confidence indicates a trustworthiness degree of the first detection result; and
    extracting the reference sub-image from the image in the target reference set based on the confidence of the first detection result.

3. The method according to claim 2, wherein
    the reference sub-image comprises an image of an area indicated by the first indication information, and confidence of a skeleton joint point in the area indicated by the first indication information meets a first preset condition.

4. The method according to claim 1, wherein the obtaining a video frame sub-image comprises:
    obtaining the video frame image;
    detecting the video frame image, to obtain a second detection result, wherein the second detection result comprises at least one of the following: a skeleton joint point of the target part of the target object in the video frame image, or second indication information, wherein the second indication information indicates an area of the target part of the target object in the video frame image;
    determining confidence of the second detection result, wherein the confidence indicates a trustworthiness degree of the second detection result; and
    extracting the video frame sub-image from the video frame image based on the confidence of the second detection result.

5. The method according to claim 4, wherein
    the video frame sub-image comprises an image of an area indicated by the second indication information, and confidence of a skeleton joint point in the area indicated by the second indication information meets a second preset condition.

6. The method according to claim 1, wherein the target reference set comprises at least one of the following:
    an image of the standard wear style of the target part of the reference object at one or more angles, or an image of the standard wear style of the target part of the reference object at one or more brightness levels.

7. The method according to claim 1, wherein the target reference set is a reference set that is updated based on a similarity between wear images in a verification set; and
    the verification set comprises at least one of the following: wear images of the target part of a verification object at two or more angles in the first scenario, or wear images of the target part of the verification object at two or more brightness levels in the first scenario.

8. The method according to claim 1, wherein the method further comprises:
processing a candidate set and a verification set by using the target model, to obtain a second processing result, wherein the candidate set comprises the target reference set; the verification set comprises at least one of the following: wear images of the target part of a verification object at two or more angles in the first scenario, or wear images of the target part of the verification object at two or more brightness levels in the first scenario; and the second processing result is a similarity that is between the wear images in the verification set and that is determined by using the candidate set as a reference; and
determining, based on the similarity indicated by the second processing result, the candidate set as the target reference set.

9. The method according to claim 1, wherein the method further comprises:
providing visual information to a user by using a display unit, wherein the visual information comprises at least one of the following:
the similarity indicated by the first processing result,
information identifying a target object whose similarity of the first processing result is lower than a first threshold; or
information identifying a target part whose similarity of the first processing result is lower than a second threshold.

10. A device, comprising at least one processor and at least one memory, wherein the at least one processor is coupled to the at least one memory, the at least one memory stores program instructions for execution by the at least one processor to cause the device to perform operations comprising:
obtaining a video frame sub-image and a reference sub-image, wherein the video frame sub-image is from a video frame image of a first scenario, the video frame image comprises an image of a target object, the video frame sub-image comprises an image of a first wear style of a target part of the target object in the first scenario, the reference sub-image is from a target reference set of the first scenario, the target reference set comprises an image of a reference object, the reference sub-image comprises an image of a standard wear style of the target part of the reference object in the first scenario, the obtaining a reference sub-image comprises obtaining the target reference set and detecting an image in the target reference set to obtain a first detection result, and the first detection result comprises a skeleton joint point of the target part of the reference object in the target reference set; and
processing the video frame sub-image and the reference sub-image by using a target model, to obtain a first processing result, wherein the target model is a trained artificial intelligence (AI) model, the target model is applied to a second scenario different from the first scenario without retraining specifically for the second scenario, and the first processing result indicates a similarity between the first wear style of the target part of the target object and the standard wear style of the target part of the reference object.

11. The device according to claim 10, wherein
the first detection result further comprises first indication information, the first indication information indicates an area of the target part of the reference object in the image in the target reference set, and the obtaining a reference sub-image further comprises:
determining confidence of the first detection result, wherein the confidence indicates a trustworthiness degree of the first detection result; and
extracting the reference sub-image from the image in the target reference set based on the confidence of the first detection result.

12. The device according to claim 11, wherein
the reference sub-image comprises an image of an area indicated by the first indication information, and confidence of a skeleton joint point in the area indicated by the first indication information meets a first preset condition.

13. The device according to claim 10, wherein the obtaining a video frame sub-image comprises:
obtaining the video frame image;
detecting the video frame image, to obtain a second detection result, wherein the second detection result comprises at least one of the following: a skeleton joint point of the target part of the target object in the video frame image, or second indication information, wherein the second indication information indicates an area of the target part of the target object in the video frame image;
determining confidence of the second detection result, wherein the confidence indicates a trustworthiness degree of the second detection result; and
extracting the video frame sub-image from the video frame image based on the confidence of the second detection result.

14. The device according to claim 13, the video frame sub-image comprises an image of an area indicated by the second indication information, and confidence of a skeleton joint point in the area indicated by the second indication information meets a second preset condition.

15. The device according to claim 10, wherein the target reference set comprises at least one of the following:
an image of the standard wear style of the target part of the reference object at one or more angles, or an image of the standard wear style of the target part of the reference object at one or more brightness levels.

16. The device according to claim 10, wherein the target reference set is a reference set that is updated based on a similarity between wear images in a verification set; and
the verification set comprises at least one of the following: wear images of the target part of a verification object at two or more angles in the first scenario, or wear images of the target part of the verification object at two or more brightness levels in the first scenario.

17. The device according to claim 10, wherein the operations further comprise:
processing a candidate set and a verification set by using the target model, to obtain a second processing result, wherein the candidate set comprises the target reference set; the verification set comprises at least one of the following: wear images of the target part of a verification object at two or more angles in the first scenario, or wear images of the target part of the verification object at two or more brightness levels in the first scenario; and the second processing result is a similarity that is between the wear images in the verification set and that is determined by using the candidate set as a reference; and
determining, based on the similarity indicated by the second processing result, the candidate set as the target reference set.

18. The device according to claim 10, wherein the operations further comprise:
providing visual information to a user by using a display unit, wherein the visual information comprises at least one of the following:
the similarity indicated by the first processing result;
information identifying a target object whose similarity of the first processing result is lower than a first threshold; or
information identifying a target part whose similarity of the first processing result is lower than a second threshold.

19. A non-transitory and computer-readable medium storing programming instructions for execution by one or more processors of a device to cause the device to perform operations comprising:
obtaining a video frame sub-image and a reference sub-image, wherein the video frame sub-image is from a video frame image of a first scenario, the video frame image comprises an image of a target object, the video frame sub-image comprises an image of a first wear style of a target part of the target object in the first scenario, the reference sub-image is from a target reference set of the first scenario, the target reference set comprises an image of a reference object, the reference sub-image comprises an image of a standard wear style of the target part of the reference object in the first scenario, the obtaining a reference sub-image comprises obtaining the target reference set and detecting an image in the target reference set to obtain a first detection result, and the first detection result comprises a skeleton joint point of the target part of the reference object in the target reference set; and
processing the video frame sub-image and the reference sub-image by using a target model, to obtain a first processing result, wherein the target model is a trained artificial intelligence (AI) model, the target model is applied to a second scenario different from the first scenario without retraining specifically for the second scenario, and the first processing result indicates a similarity between the first wear style of the target part of the target object and the standard wear style of the target part of the reference object.

20. The non-transitory and computer-readable medium according to claim 19, wherein the first detection result further comprises first indication information, the first indication information indicates an area of the target part of the reference object in the image in the target reference set, and the obtaining a reference sub-image further comprises:
determining confidence of the first detection result, wherein the confidence indicates a trustworthiness degree of the first detection result; and
extracting the reference sub-image from the image in the target reference set based on the confidence of the first detection result.

* * * * *